United States Patent
Gaurav et al.

(10) Patent No.: US 8,108,767 B2
(45) Date of Patent: Jan. 31, 2012

(54) ELECTRONIC DATA INTERCHANGE TRANSACTION SET DEFINITION BASED INSTANCE EDITING

(75) Inventors: Suraj Gaurav, Issaquah, WA (US); Surendra Machiraju, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1147 days.

(21) Appl. No.: 11/533,658

(22) Filed: Sep. 20, 2006

(65) Prior Publication Data

US 2008/0072160 A1    Mar. 20, 2008

(51) Int. Cl.
G06F 17/00    (2006.01)

(52) U.S. Cl. .................................. 715/237; 715/255

(58) Field of Classification Search .................. 715/234, 715/237, 255; 707/607
See application file for complete search history.

(56) References Cited

U.S. PATENT DOCUMENTS

| | | |
|---|---|---|
| 4,951,196 A | 8/1990 | Jackson |
| 5,202,977 A | 4/1993 | Pasetes, Jr. et al. |
| 5,367,664 A | 11/1994 | Magill et al. |
| 5,638,519 A | 6/1997 | Haluska |
| 5,687,385 A | 11/1997 | Janay |
| 5,758,126 A | 5/1998 | Daniels et al. |
| 5,778,223 A | 7/1998 | Velissaropoulos et al. |
| 5,878,419 A | 3/1999 | Carter |
| 5,909,570 A | 6/1999 | Webber |
| 6,151,608 A | 11/2000 | Abrams |
| 6,182,029 B1 | 1/2001 | Friedman |
| 6,199,068 B1 | 3/2001 | Carpenter et al. |
| 6,216,137 B1 | 4/2001 | Nguyen et al. |
| 6,381,743 B1 | 4/2002 | Mutschler, III |
| 6,418,400 B1 | 7/2002 | Webber |
| 6,453,356 B1 | 9/2002 | Sheard et al. |
| 6,480,860 B1 | 11/2002 | Monday |
| 6,542,873 B1 | 4/2003 | Goodwin, III et al. |
| 6,567,821 B1 | 5/2003 | Polk |
| 6,571,282 B1 | 5/2003 | Bowman-Amuah |
| 6,609,200 B2 | 8/2003 | Anderson et al. |
| 6,615,253 B1 | 9/2003 | Bowman-Amuah |
| 6,640,244 B1 | 10/2003 | Bowman-Amuah |
| 6,658,483 B1 | 12/2003 | Iwamoto et al. |
| 6,694,321 B1 | 2/2004 | Berno |

(Continued)

FOREIGN PATENT DOCUMENTS

KR    1020020033380 A    5/2002

OTHER PUBLICATIONS

Altova XMLSpy 2005 User & Reference Manual, http://v2005.sw.altova.com/xmlspy2005.pdf (Nov. 2004).*

(Continued)

*Primary Examiner* — Adam M Queler
(74) *Attorney, Agent, or Firm* — Workman Nydegger

(57) ABSTRACT

An EDI document instance is generated or edited via an editor tool that also displays a corresponding EDI schema, thus allowing editing of an EDI document instance alongside its corresponding EDI schema, thereby interrelating EDI document creation or editing with the corresponding EDI schema. Either the EDI document instance or the EDI schema elements can be modified via the editor tool, and in various non-limiting embodiments, any errors in the formation or modification of an EDI document are automatically highlighted or otherwise recorded and/or displayed via the editor tool. EDI instances can be edited in either native or XML form.

16 Claims, 16 Drawing Sheets

U.S. PATENT DOCUMENTS

| Patent/Publication No. | | Date | Inventor(s) |
|---|---|---|---|
| 6,718,516 | B1 | 4/2004 | Claussen et al. |
| 6,724,896 | B1 | 4/2004 | Beckett et al. |
| 6,772,180 | B1 | 8/2004 | Li et al. |
| 6,799,182 | B2 | 9/2004 | Bata |
| 6,901,380 | B1 | 5/2005 | Bremers |
| 6,915,287 | B1 | 7/2005 | Felsted et al. |
| 6,928,487 | B2 | 8/2005 | Eggebraaten et al. |
| 6,938,021 | B2 | 8/2005 | Shear et al. |
| 6,963,920 | B1 | 11/2005 | Hohmann et al. |
| 6,970,876 | B2 | 11/2005 | Hotti et al. |
| 6,996,589 | B1 | 2/2006 | Jayaram et al. |
| 7,043,687 | B2 | 5/2006 | Knauss et al. |
| 7,051,071 | B2 | 5/2006 | Stewart |
| 7,058,886 | B1 | 6/2006 | Sulistio et al. |
| 7,062,500 | B1 | 6/2006 | Hall et al. |
| 7,065,742 | B1 | 6/2006 | Bogdan |
| 7,072,909 | B2 | 7/2006 | Polk |
| 7,076,652 | B2 | 7/2006 | Ginter et al. |
| 7,099,896 | B2 | 8/2006 | Fields et al. |
| 2001/0044811 | A1* | 11/2001 | Ballantyne et al. .......... 707/513 |
| 2002/0049790 | A1 | 4/2002 | Ricker et al. |
| 2002/0085033 | A1 | 7/2002 | Robinson et al. |
| 2002/0111964 | A1 | 8/2002 | Chen et al. |
| 2002/0129045 | A1 | 9/2002 | Aoyama et al. |
| 2002/0161907 | A1 | 10/2002 | Moon |
| 2003/0088543 | A1 | 5/2003 | Skeen et al. |
| 2003/0097637 | A1 | 5/2003 | Tozawa et al. |
| 2003/0101184 | A1 | 5/2003 | Chiu et al. |
| 2003/0121001 | A1 | 6/2003 | Jeannette et al. |
| 2003/0121008 | A1 | 6/2003 | Tischer |
| 2003/0158805 | A1 | 8/2003 | Mozhdehi |
| 2004/0001099 | A1 | 1/2004 | Reynar et al. |
| 2004/0054610 | A1 | 3/2004 | Amstutz et al. |
| 2004/0098311 | A1* | 5/2004 | Nair et al. .................. 705/26 |
| 2004/0103367 | A1 | 5/2004 | Riss et al. |
| 2004/0225571 | A1 | 11/2004 | Urali |
| 2004/0237038 | A1 | 11/2004 | Stuhec |
| 2004/0254953 | A1* | 12/2004 | Vincent, III ............... 707/103 Y |
| 2004/0268229 | A1* | 12/2004 | Paoli et al. ................. 715/508 |
| 2005/0015377 | A1 | 1/2005 | Wan |
| 2005/0060324 | A1 | 3/2005 | Johnson et al. |
| 2005/0108630 | A1 | 5/2005 | Wasson et al. |
| 2005/0138047 | A1 | 6/2005 | Liu et al. |
| 2005/0154978 | A1* | 7/2005 | Albornoz et al. ............. 715/513 |
| 2005/0177578 | A1 | 8/2005 | Chen et al. |
| 2005/0203953 | A1 | 9/2005 | McGee et al. |
| 2005/0204347 | A1 | 9/2005 | Jurkiewicz et al. |
| 2005/0257193 | A1* | 11/2005 | Falk et al. .................. 717/109 |
| 2005/0262499 | A1 | 11/2005 | Read |
| 2005/0273467 | A1 | 12/2005 | Gardner |
| 2005/0278270 | A1* | 12/2005 | Carr et al. .................. 706/25 |
| 2005/0278345 | A1 | 12/2005 | Andra et al. |
| 2005/0289186 | A1 | 12/2005 | Guo et al. |
| 2006/0031757 | A9* | 2/2006 | Vincent, III ................. 715/513 |
| 2006/0036522 | A1 | 2/2006 | Perham |
| 2006/0136812 | A1* | 6/2006 | Jones et al. .................. 715/511 |
| 2006/0143459 | A1 | 6/2006 | Villaron et al. |
| 2006/0236317 | A1 | 10/2006 | Wetherly et al. |
| 2006/0259456 | A1 | 11/2006 | Falk et al. |
| 2007/0112579 | A1 | 5/2007 | Ratnakaran et al. |
| 2007/0143334 | A1 | 6/2007 | Gaurav et al. |
| 2007/0156716 | A1 | 7/2007 | Said et al. |
| 2007/0203928 | A1 | 8/2007 | Machiraju et al. |
| 2007/0299858 | A1 | 12/2007 | Norcott |
| 2008/0147704 | A1 | 6/2008 | Godwin et al. |
| 2008/0222192 | A1 | 9/2008 | Hughes |
| 2008/0235251 | A1 | 9/2008 | Shmueli et al. |

OTHER PUBLICATIONS

Electronic Data Interchange, Federal Information Processing Standards Publication 161-2, Apr. 29, 1996, http://www.itl.nist.gov/fipspubs/fip161-2.htm.*

Guidline XML (gXML), Version 0.7, Mar. 2, 1999, Initial Draft; http://xml.coverpages.org/GXML-Draft-v07-pdf.gz.

David Messinger, EDI Testing Requirements Specification, Topcoder Software, Jul. 30, 2004, http://www.topcoder.com/i/development/downloads/EDI_Transaction_Processor.pdf.

Uddam Chukmol, et al., EXSMAL:EDI/XML semi-automatic Schema Matching ALgorithm, Proceedings of the Seventh IEEE International Conference on E-Commerce Technology, 2005, http://ieeexplore.ieee.org/iel5/10218/32584/01524079.pdf?isNumber=.

Altova Schema Agent, Viewing MapForce Mapping Designs; Dec. 5, 2006, http://www.altova.com/schemaagent_mapforce.html.

Tova Milo and Sagit Zohar. Using schema matching to simplify heterogeneous data translation. In Proc. of the Int. Conf. on Very Large Data Bases (VLDB), New York City, USA, 1998. http://www.sigmod.org/vldb/conf/1998/p122.pdf.

A. Doan, P. Domingos, and A. Levy. Reconciling Schemas of Disparate Data Sources: A Maching-Learning Approach. In SIGMOD, pp. 509-520, 2001. http://anhai.cs.uiuc.edu/home/papers/sigmod01.pdf.

Grundy, J.C., Mugridge, W.B., Hosking, J.G. and Kendall, P. Generating EDI Message Translations from Visual Specifications, In Proceedings of the 2001 IEEE Automated Software Engineering Conference, San Diego, CA, Nov. 26-28, 2001, IEEE CS Press. http://www.cs.auckland.ac.nz/~john-g/papers/ase2001_1.pdf.

OA Dated Dec. 15, 2008 for U.S. Appl. No. 11/621,372, 35 pages.
OA Dated Feb. 25, 2009 for U.S. Appl. No. 11/533,601, 77 pages.
OA Dated Mar. 2, 2009 for U.S. Appl. No. 11/533,626, 46 pages.
International Search Report dated Jan. 15, 2008 for PCT Application Serial No. PCT/US2007/078736, 2 Pages.

International Search Report and Written Opinion dated Mar. 12, 2008, for PCT Application Serial No. PCT/US2007/078733, 10 Pages.

International Search Report and Written Opinion dated Apr. 29, 2008 for PCT Application Serial No. PCT/US2007/089239, 10 Pages.

International Search Report and Written Opinion dated Apr. 29, 2008 for PCT Application Serial No. PCT/US2007/089238, 10 Pages.

Pal, et al., "XML Support in Microsoft SQL Server 2005", May 2004, http://www.only4gurus.net/microsoft/xml_sql_2005.pdf.

Zou, et al., "A Framework for Migrating Procedural Code to Object-Oriented Platforms", http://braindump.samedi-studios.com/people/crutcher/paper-cache/apsec01-kk-yz-f10.pdf.

Liu, et al., "Configurable Indexing and Ranking for XML Information Retrieval", 2004, pp. 88-95, http://delivery.acm.org/10.1145/1010000/1009010/p88-liu.pdf?key1=1009010&key2=3952344511& coll=portal&dl=GUIDE&CFID=626850&CFTOKEN=31267320.

"Desktop EDI™", http://www.gxs.com/products/accelerators/desktop_EDI.htm.

"Understanding BizTalk Server 2006", Oct. 2005, http://download.microsoft.com/download/E/5/A/E5A1D056-5778-4DB1-94F4-9AE6C4496AC4/Understanding.doc.

Lee, Ronald M., "Design of Electronic Documents Using XML Schemas", Aug. 27, 2001, http://www.euridis.nl/pub/documentation/IPXDOCN_04SEP01/IPXDOCN_XMLSCHEMA_27aug01.doc.

Wob, Wolfram, "Enhancing E-Business Applications in Small and Medium-Sized Enterprises with XML-based EDI", http://www.faw.uni-linz.ac.at/FAW_WWW/online/papers/2003sci/ww_sci03.pdf.

Adam et al., "EDI through a Distributed Information Systems Approach", Date: Jan. 6-9, 1998,pp. 354-363 , vol. 7, http://ieeexplore.ieee.org/iel4/5217/14150/00649230.pdf?isnumber=&arnumber=649230.

Korhonen, et al., "Visualization of EDI messages: Facing the problems in the use of XML", Date: Apr. 2003, http://delivery.acm.org/10.1145/950000/948065/p465-korhonen.pdf?key1=948065&key2=3287054511&coll=Portal&dl=GUIDE&CFID=74220359&CFTOKEN=92790055.

Suresh Damodaran, "B2B Integration over the Internet with XML—RosettaNet Successes and Challenges", Date: 2004, http://www2004.org/proceedings/docs/2p188.pdf.

Abitbout, et al., "Declarative Specification of Electronic Commerce Applications", Feb. 2000, http://www.cs.toronto.edu/~mignet/Publications/ieee2000.pdf.

Friedrich II, John R., "Meta-Data Version and Configuration Management in Multi-Vendor Environments", 2005, pp. 799-804, http://delivery.acm.org/10.1145/1070000/1066251/p799-friedrich.pdf?key1=1066251&key2=7522954511&coll=GUIDE&dl=GUIDE&CFID=741587&CFTOKEN=83197199.

Rollins, et al., "A framework for creating customized multi-modal interfaces for XML documents", 2000, pp. 933-936, vol. 2, http://ieeexplore.ieee.org/xpl/abs_free.jsp?arNumber=871512.

Florescu, et al., "Storing and Querying XML Data using an RDMBS", 1999, http://scholar.google.com/scholar?hl=en&lr=&q=cache:m3NVseOL_1UJ:dblab.ssu.ac.kr/development/benchmark/XML/FIKo99.pdf+%22 electronic+ data+interchange%22+grouping+indexing+cluster.

Per, Christiansson, "Using Knowledge Nodes for Knowledge Discovery and Data Mining", 1998, pp. 48-59, http://it.civil.auc.dk/it/reports/ascona_98/ascona98.html.

"PeopleSoft EDI Messaging", http://download-west.oracle.com/otn_hosted_doc/psft/fscm/Electronic%20Data%20Interchange.pdf.

Bohannon, et al., "Information preserving XML schema embedding", 2005, pp. 85-96, VLDB Endowment, http://portal.acm.org/citation.cfm?id=1083606 http://delivery.acm.org/10.1145/1090000/1083606/p85-bohannon.pdf?key1=1083606&key2=9573154511&coll=GUIDE&dl= GUIDE&CFID= 2735513& CFTOKEN= 8053-7832.

Ogbuji, Uche, "XML: The future of EDI", http://www.oasis-open.org/cover/ogbuji-swol-02-xmledi.html.

* cited by examiner

```
ISA*01*123456789012345*01*987654321*ZZ*WALMART8901234567*ZZ*CONTOSO8901234567*060613*1226*U*00401*000000025*0*T*>
GS*PO*7654321*1234567*19991221*1226*1*X*004010
ST*850*0001
BEG*00*NE*3859199838*19950727*IBM
PER*AA*Andrew Carlson*TE*(708) 555-2930
DTM*002*19970523
PO1*1*93*BX*145.39**CB*KOW-20392-10
PID*F****Uninterruptible Power System
PER*AA*Camilla Anderson*TE*(708) 555-2011
PO1*2*25*EA*35.68**CB*1093-4927-001
PID*F****High Volume Printer Stand
PER*AA*Miranda Cappelan*TE*(708) 555-1111
PO1*3*4*PC*2002.91**CB*ABX-2001
PID*F****Electronics Cabinet Package (56" High)
CTT*3
SE*14*0001
ST*850*0002
BEG*00*NE*3859199838*19950727*IBM
PER*AA*Andrew Carlson*TE*(708) 555-2930
DTM*002*19970523
PO1*1*93*BX*145.39**CB*KOW-20392-10
PID*F****Uninterruptible Power System
PER*AA*Camilla Anderson*TE*(708) 555-2011
PO1*2*25*EA*35.68**CB*1093-4927-001
PID*F****High Volume Printer Stand
PER*AA*Miranda Cappelan*TE*(708) 555-1111
PO1*3*4*PC*2002.91**CB*ABX-2001
PID*F****Electronics Cabinet Package (56" High)
CTT*3
SE*14*0002
ST*850*0003
BEG*0055555*NE*3859199838***19950727***IBM
PER*AA*Amdrew Carlson*TE*(708) 555-2930
DTM*002*19970523
PO1*1*93*BX*145.39**CB*KOW-20392-10
PID*F****Uninterruptible Power System
PER*AA*Camilla Anderson*TE*(708) 555-2011
PO1*2*25*EA*35.68**CB*1093-4927-001
PID*F****High Volume Printer Stand
PER*AA*Miranda Cappelan*TE*(708) 555-1111
PO1*3*4*PC*2002.91**CB*ABX-2001
PID*F****Electronics Cabinet Package (56" High)
CTT*3
SE*14*0003
GE*3*1
IEA*1*000000025
```

1410, Bad Data 1412, UI 1400

FIG. 14

ELECTRONIC DATA INTERCHANGE TRANSACTION SET DEFINITION BASED INSTANCE EDITING

TECHNICAL FIELD

The subject disclosure relates to the creation and/or modification of electronic data interchange (EDI) instance(s) in native or Xml form based on a corresponding transaction set definition (TSD).

BACKGROUND

Traditionally, with EDI, organizations have been empowered to send virtually limitless kinds of structured messages to one another to facilitate the communication of any kind of business data from one organization to another in automated ways. In this regard, once setup properly, EDI messages can be used to automate a variety of communications to and from partners, business sub-units, buyers, etc., thereby substantially reducing the overhead associated with filling out paper forms, storing volumes of papers, etc. With EDI, for instance, an organization merely fills out an electronic form in a manner conforming to a pre-defined schema, called a transaction set definition (TSD), and then the messaging, storage/record keeping and validation of the message(s) associated with the electronic form occurs automatically.

In current EDI messaging scenarios, which applies to both inbound messages (i.e., where a message is received by an organization) and to outbound messages (i.e., where a message is transmitted from an organization to an intended recipient of the message), a single message can be addressed for multiple parties, and multiple messages can be received from different parties. EDI messages can be represented in a native EDI compact file format, or as an extensible markup language (XML) file, and there are known ways of transforming from EDI flat files to XML representations, and vice versa. EDI data is transmitted as delimited files (without self describing tags) and therefore the encoding rules enforce very strict formatting rules to ensure destination application(s) are able to successfully parse and consume the information for down stream processing.

Today, XML Schema Definitions (XSDs), external data representations (XDRs) and document type definitions (DTDs) are typically used to represent schemas for EDI messages. In this regard, XSDs, XDRs and DTDs are schema files that can be created to describe TSDs, i.e., schemas for particular kinds of EDI messages. Today, these XSD, XDR and DTD files are stored as individual files that are used in connection with the validation of EDI messages in an EDI system.

Thus, EDI messages have an associated EDI TSD, which can be represented in a variety of formats. A TSD is a schema that instructs an EDI system how to interpret a given EDI message instance, i.e., how to validate an EDI message has been structured correctly and with appropriate information. For instance, when an EDI message of a particular type, e.g., a purchase order, is created in an EDI system, the EDI message should be created so that it conforms to the purchase order schema, and when an EDI message is received by another party, the schema is used to validate that the EDI message has been formed correctly. Sometimes, a party may additionally wish to edit an EDI message instance, however, the tools available for editing EDI message instances are currently inadequate.

In this regard, due to the cryptic nature of EDI encoding rules, generating valid instances of EDI documents remains challenging today because errors can be obscure to detect since the encoding rules by design compact data to a minimum amount of information that is difficult to read. For instance, FIG. 14 illustrates an exemplary instance 1410 of an EDI interchange displayed in a flat file editor UI 1400. Manual review of the EDI encoding to discover errors, or to edit an EDI element, can be difficult given the cryptic nature of the EDI encoding of instance 1410. For instance, finding bad data 1412 by hand would be extremely taxing. If more than a trivial number of instances are involved, such manual review is prohibitive.

An existing tool for EDI systems can be used to validate an instance of an EDI document against an associated TSD to determine whether it is a valid instance. Where the tool encounters an error based on review of the associated schema rules, the tool highlights the error, however, a user of such an editing tool must still consult the TSD to determine how to fix the error since the native EDI encoding is difficult to understand, i.e., merely highlighting bad data 1412 of interchange 1410 yields little information about how to correct the bad data 1412 to form a valid instance.

Accordingly, in consideration of the lack of sophistication of the current state of the art of the generation and modification of EDI documents based on EDI schemas in an EDI communications system, it would be desirable to provide improved tools for improved creation, editing, display and interaction with EDI instances relative to associated schemas in an EDI system. These and other deficiencies in the state of the art of EDI messaging will become apparent upon description of the various exemplary non-limiting embodiments of the invention set forth in more detail below.

SUMMARY

In consideration of the foregoing, the invention provides an EDI TSD-based EDI instance editor In various non-limiting embodiments, EDI document(s) instance are generated or edited via an editor tool that also displays corresponding EDI schema(s), thus allowing editing of EDI document(s) instance alongside corresponding EDI schema(s). In various non-limiting embodiments, the process of EDI document creation or editing is automatically interrelated with the corresponding EDI schema. Either the EDI document instance(s) or the EDI schema element(s) can be modified via the editor tool, and in various non-limiting embodiments, any errors in the formation or modification of an EDI document are automatically highlighted or otherwise recorded and/or displayed via the editor tool. In other non-limiting embodiments, EDI instances can be edited in either native or XML form.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the invention in a simplified form as a prelude to the more detailed description that follows.

BRIEF DESCRIPTION OF THE DRAWINGS

The system and methods for editing EDI instances and/or schema in accordance with the present invention are further described with reference to the accompanying drawings in which:

FIG. 14 is a block diagram of an exemplary instance of EDI encoded transaction set data;

DETAILED DESCRIPTION

Overview

Figure 1:
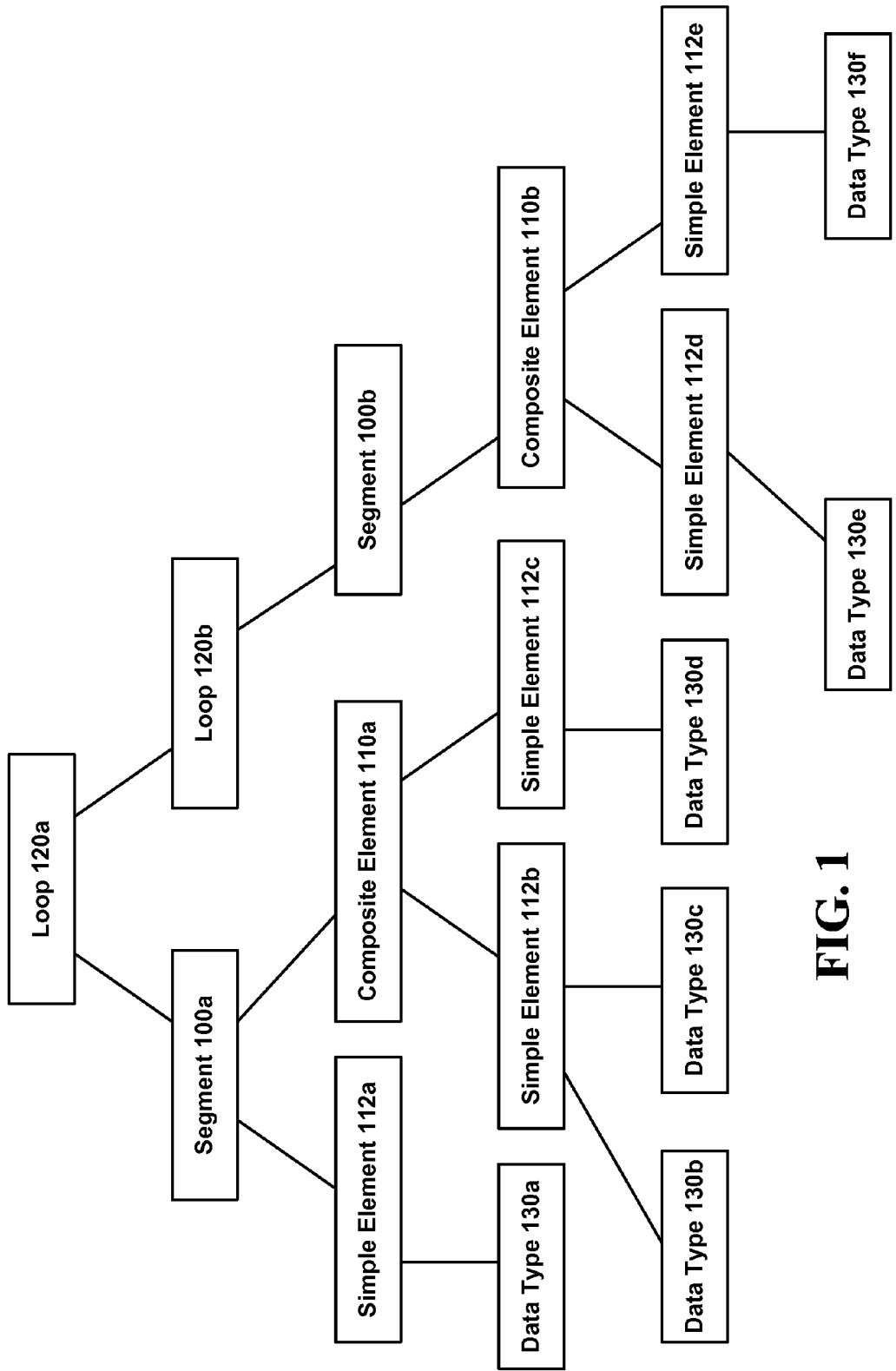
FIG. 1 illustrates an exemplary non-limiting tree-based representation of an EDI TSD in accordance with instance editing techniques of the invention.

In consideration of the lack of sophistication with today's EDI document editing tools for EDI communications systems, in various non-limiting embodiments, the invention provides an editing component including a user interface that displays EDI transaction set instance(s) and associated transaction set definition(s) (TSDs), and receives editing input for editing EDI data element(s) of the EDI transaction set instance(s) based on the associated TSD(s). The TSD(s) define conformance of the EDI transaction set instance(s) according to a set of rules applying to the EDI data element(s) of the EDI transaction set instance(s), and can also be modified via the editing component. An EDI messaging engine operates to process the editing input to generate or modify representation(s) of the EDI transaction set instance(s) or TSD(s).

In various non-limiting embodiments, data elements of the EDI document being generated or edited are highlighted to indicate an error due to non-conformance with the associated TSD. The errors can be recorded in an error log, and displayed to the user via the editing tool. Additionally, warnings can be furnished to a user concerning potentially non-conforming data values in the EDI instance(s) based on an analysis of the associated TSD(s).

EDI Data Elements as Tree Structures in Relational Store

In various non-limiting embodiments, the invention provides tools for editing and displaying EDI instances and EDI schemas. In one non-limiting embodiment, data elements of EDI document instances and EDI schema are stored as tree structures in a relational data store. In various embodiments of the invention, such a non-limiting way to store the data enables the display of EDI document instances and EDI schema according to the hierarchical tree structure represented by the underlying EDI data elements. The structure of EDI encoded instances based on EDI schema is thus described in non-limiting detail below.

As mentioned, there are thousands of TSDs in an EDI system that represent EDI message types. With EDI, a TSD is identified by a DocType, which is a combination of namespace and root node name. More formally, this is described by the following relation:

DocType=TargetNamespace '#' RootNodeName

X12 schemas are represented according to the following form: X12_{Version}_{TsId}. In this X12 form, all schemas have a root node name that starts with 'X12'. The 'Version' in turn represents the version of the document, which is a dynamic piece of information that is configuration or instance driven. Lastly, 'TsId' is the transaction identifier of the document being processed and is always read from the input instance.

Edifact schemas are represented according to the following form: Efact_{Version}_{Tsid} Thus, all Edifact schemas have a root node name that starts with 'Efact'. 'Version' represents the version of the document, and 'Version' is a dynamic piece of information which is instance driven, i.e., configuration driven is not an option with Edifact schemas. 'TsId' again represents the transaction identifier of the document being processed and is always read from the input instance.

An EDI schema consists of a root node. Each root node can have a sequence of loops and segments as children. Loops can contain nested sub-loops or segments. The hierarchical tree structure of an exemplary TSD is illustrated in FIG. 1. At the lowest level of re-use in the presently described embodiment of the invention, data types 130*a*, 130*b*, 130*c*, 130*d*, 130*e*, 130*f* can be re-used across different schema TSDs. Then, at the next level are Simple Data Elements 112*a*, 112*b*, 112*c*, 112*d*, 112*e*, etc. that contain Data types. Composite Data Elements 110*a* and 110*b* contain other Simple Data Elements such as Simple Data Elements 112*b* and 112*c* and Simple Data Elements 112*d* and 112*e*, respectively. Segment 100*a* contains Simple Data Element 112*a* and Composite Data Element 110*a*. Segment 100*b* contains Composite Data Element 110*b*. Lastly, Loop 120*a* contains Loop 120*b* and Segment 100*a*, and Loop 120*b* further contains Segment 100*b*.

In more formal terms, an EDI document schema includes the following structure

Schema->RootNode
RootNode->(Block)+
Block->Segment|Loop
Loop->(Block)+
Segment->(DataElement)+, RuleSet
DataElement->SimpleField|CompositeField
SimpleField->name, dataTypeName
CompositeField->(SimpleField)+

In these more formal terms, segments 100*a*, 100*b*, etc. of the EDI schema of FIG. 1 thus include EDI Data Elements ("Data Elements"), including composite data elements that are collections of Data Elements. Data Elements include a name, and its minimum and maximum number of occurrences, and a Data Type, e.g., "AN" which means alphanumeric, or "N" which means numeric. Data Types for Data Elements can be defined to include a minimum length, a maximum length, a name (e.g., UOM—unit of measure), and values for the name (e.g., kg, ml, cc, lbs, etc.).

More specifically, X12 Data Types can be any of the following:

Nn—an integer type with an implied decimal point, specified by n>=0.
ID—an enumeration data type with optional length restrictions.
AN—an alphanumeric data type with length restrictions.
R—a real number.
Date—a date data type.
Time—a time data type And Edifact data types can be defined to be any of the following:

A—an alphabetic data type with a length restriction.
N—a numeric data type with length restriction.
ID—an enumeration data type with optional length restrictions.
AN—an alphanumeric data type with length restrictions.

As mentioned in the background, in the past, these structures have been represented in XSDs, XDRs, DTDs, etc., i.e., as separate files. However, this does not leverage the powers that relational forms of storage have yielded for the storage of data. In this regard, in an exemplary, non-limiting aspect of the invention, EDI schema and the associated EDI Data Elements are stored as a relational schema, i.e., stored in a relational database as a relational file, e.g., Microsoft's Access files (MDB format), as described in more detail below. The tree structure of the EDI schema of FIG. 1 lends itself to efficient storage in a relational format, in that relational data structures are well suited to representing hierarchical tree data.

Thus, a data dictionary for EDI schema can be generated that represents EDI Data in relational storage, such as the structured query language (SQL) format. As a result, EDI TSDs can be decomposed into smaller pieces that can be efficiently reused by other TSDs. Thus, in accordance with an exemplary embodiment of the invention, EDI building blocks that can be reused include Data types, Simple data elements containing DataTypes, Composite data elements that contain other Simple data elements, Segments that contain Simple and/or Composite elements and Loops that contain other Loops and/or Segments.

In addition to data elements being able to be re-used in storage, the data element view of EDI schema can also be displayed via the editor tool of the invention. Accordingly, any of Loops, Segments, Simple Data Elements, Composite Data Elements and/or Data Types can thus be re-used or displayed as EDI schema building blocks, and the building blocks are optionally allowed to evolve over time and be modified, e.g., to reflect changing business needs, or to correct errors, as discussed in further detail below.

TSD-Based Editing of EDI Document Instances

In various non-limiting embodiments, the invention provides tools for editing and displaying EDI document instances and EDI schemas. As discussed in the background, EDI data is transmitted as delimited files (without self describing tags) and therefore the encoding rules enforce very strict formatting rules to ensure the destination application is able to successfully parse and consume the information for down stream processing.

Currently, based on implementation guides, or companion guides (e.g., represented in PDF or word processor formats), users are expected to define TSDs for computer based validation. Common formats for such definitions are DTD or XSD, or other EDI rules for generating valid EDI documents stored in a database. Based on the TSD represented in the companion guides, users manually create instances of EDI documents for sharing with partners and passing and failing test scenarios. Manually creating these instances of EDI Documents is non-trivial, however, since EDI documents are cryptically encoded.

The invention thus provides an EDI transaction set editor with a context sensitive editor for EDI documents. Thus, users can create or edit documents based on a specific TSD, and vary the TSD along the way. In various non-limiting embodiments, both negative and positive instances can be created. The TSD can be varied when generating or editing EDI instances to generate varying types of instances, e.g., varying in terms of strings used, count of repetitions, min/max length of elements, etc., i.e., varying any schema elements described in the foregoing section to affect the generation or editing of instances.

Figure 2:
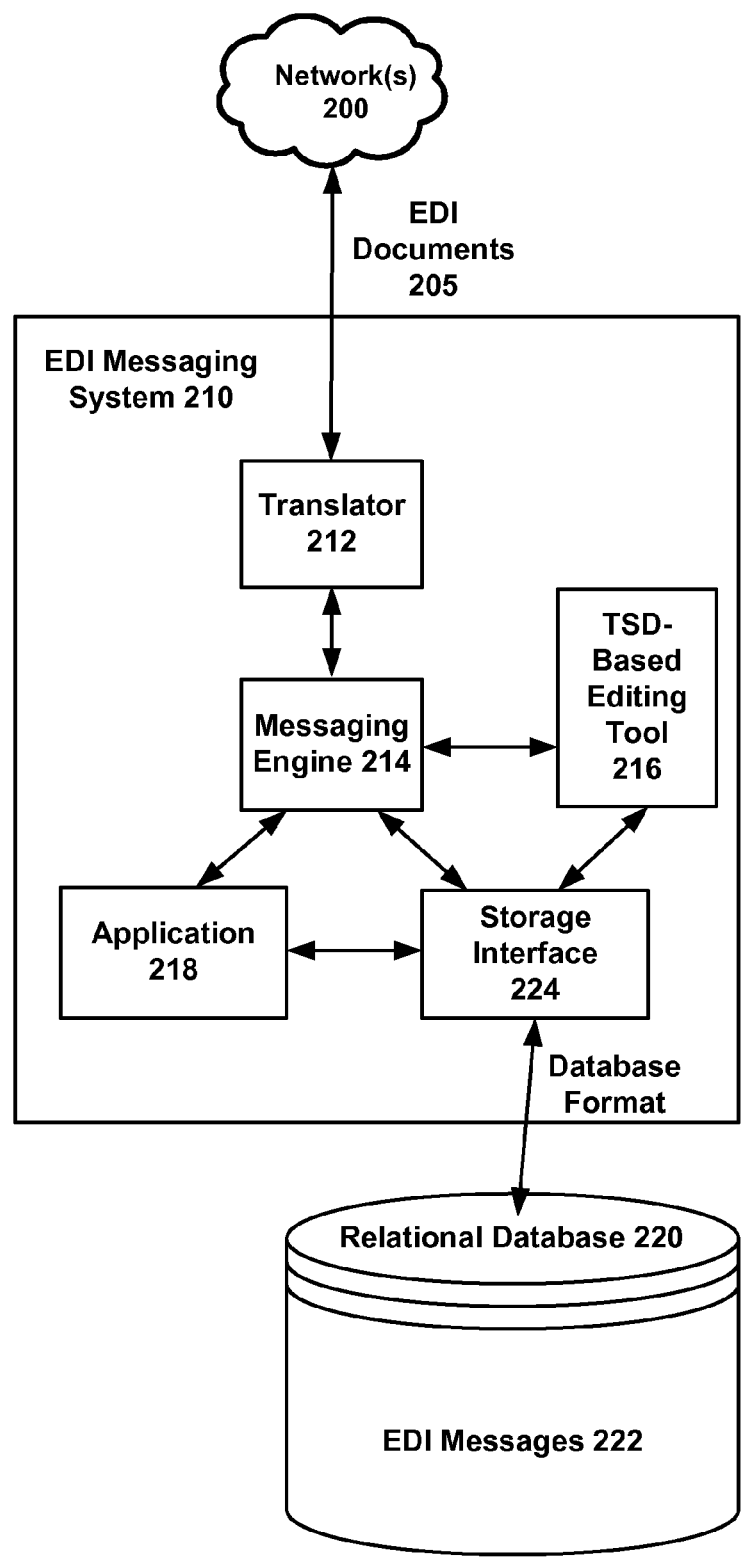
FIG. 2 illustrates an exemplary EDI system that may include a TSD based EDI document editor in accordance with the invention.

FIG. 2 represents an exemplary non-limiting EDI messaging system in which the edition tool of the invention may be utilized. For instance, EDI messaging system 210 transmits EDI documents 205 to or receives EDI documents 205 from messaging partners via network(s) 200. A translator 212 optionally translates one or more formats of the EDI documents 205 into a desired format. An EDI messaging engine operates to validate the content of the documents 205, retrieving any EDI messages or schema 222 from database 220. In one non-limiting embodiment, database 220 is a relational database. Any number of applications 218 might potentially cooperate with messaging engine 214 to perform additional layers of custom processing on the messages handled by engine 214. A storage interface 224 is further provided to handle the storage and retrieval of EDI messages and schema 222 from database 220, including any necessary translations to or from the native database format. In various non-limiting embodiments, an EDI messaging system 210 may also include the editing tool 216 for editing, analyzing and displaying EDI document instances and EDI schemas.

Figure 3:
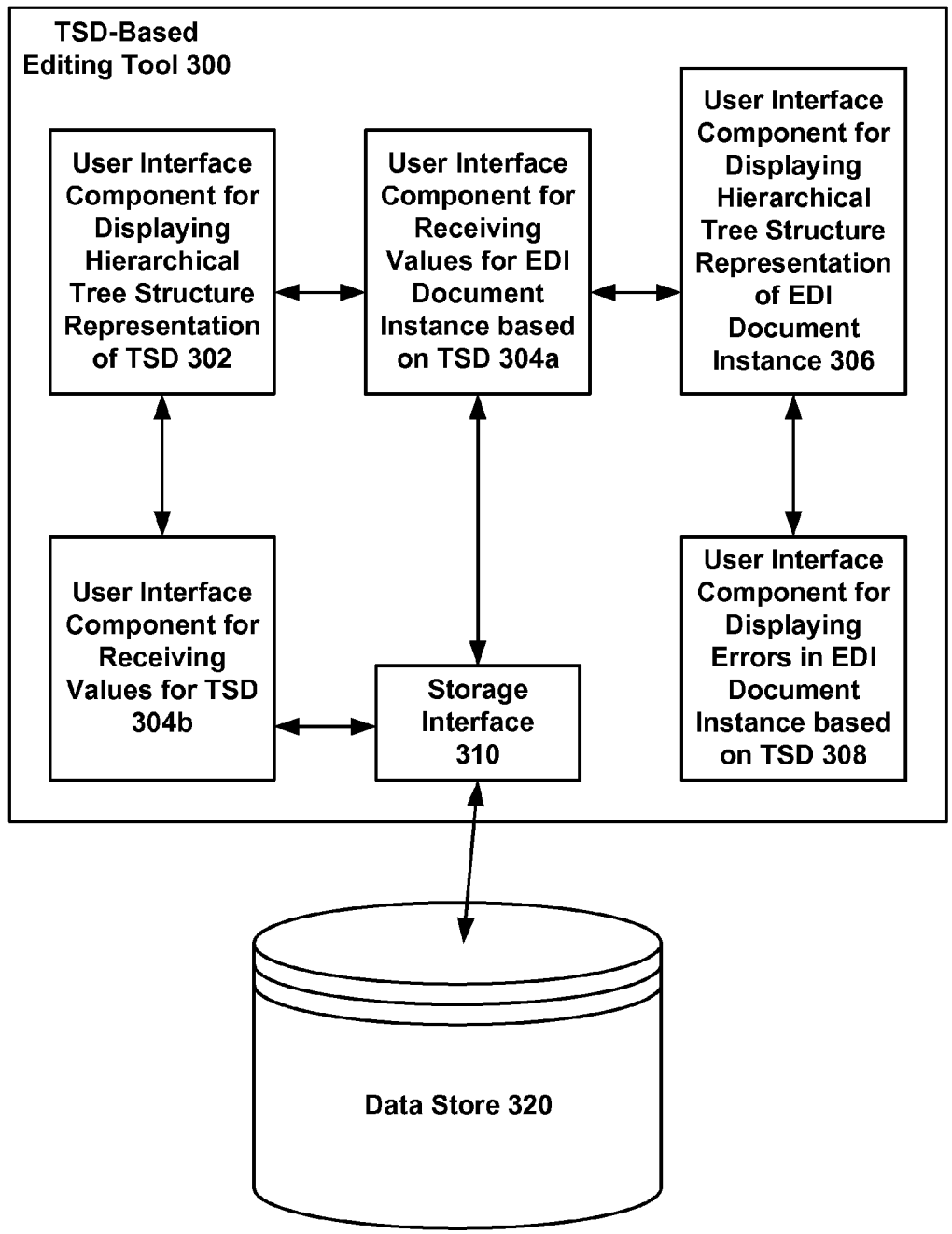
FIG. 3 is a block diagram illustrating various exemplary non-limiting user interface components for an editing tool in accordance with the invention.

FIG. 3 is a block diagram of an exemplary non-limiting embodiment of a TSD-based editing tool 300 in accordance with the invention. Tool 300 includes storage interface 310 for the retrieval or storage of EDI documents and/or EDI schema from data store 320. When one or more user interface portions or components receive values to generate or edit an EDI document or schema in accordance with the tool 300 of the invention, the new version of the EDI document or schema can be stored in data store 320 via storage interface 310. In various non-limiting embodiments, the invention includes a plurality of user interface components for displaying aspects of an EDI document being generated or edited, based on an associated TSD.

In this regard, the invention includes a user interface component 302 for displaying a hierarchical tree structure representation of the schema elements of a TSD, described in more detail above, and also a user interface component 306 for displaying hierarchical tree structure representation of the data elements of an EDI document instance. In one non-limiting embodiment, a user interface component 304a is also provided for receiving values for EDI document instances being generated or edited. Similarly, and advantageously, the TSD can be varied via user interface component 304b to change a particular TSD element on the fly while otherwise generating or editing instances in accordance with user interface component 304a.

Optionally, a user interface component 308 may operate to determine if any errors exist in the document instance based on conformance or non-conformance of the data elements of the document instance to the EDI schema. If errors exist, these can be recorded by the EDI messaging system, and displayed via user interface 308 to the user. Reasons for the errors can also be recorded and displayed to the user to help ease the process of finding and fixing errors.

Warnings may also be generated prior to receiving input that will cause an error. This gives the user a chance to change the values being provided to the EDI document instance editor portion, or change the EDI schema, if it instead is not correct. Color coding or highlighting of the relevant data elements in the hierarchical tree structure representations of the document instances may also be performed to help the user quickly identify defective nodes in a transaction set.

Figure 4:
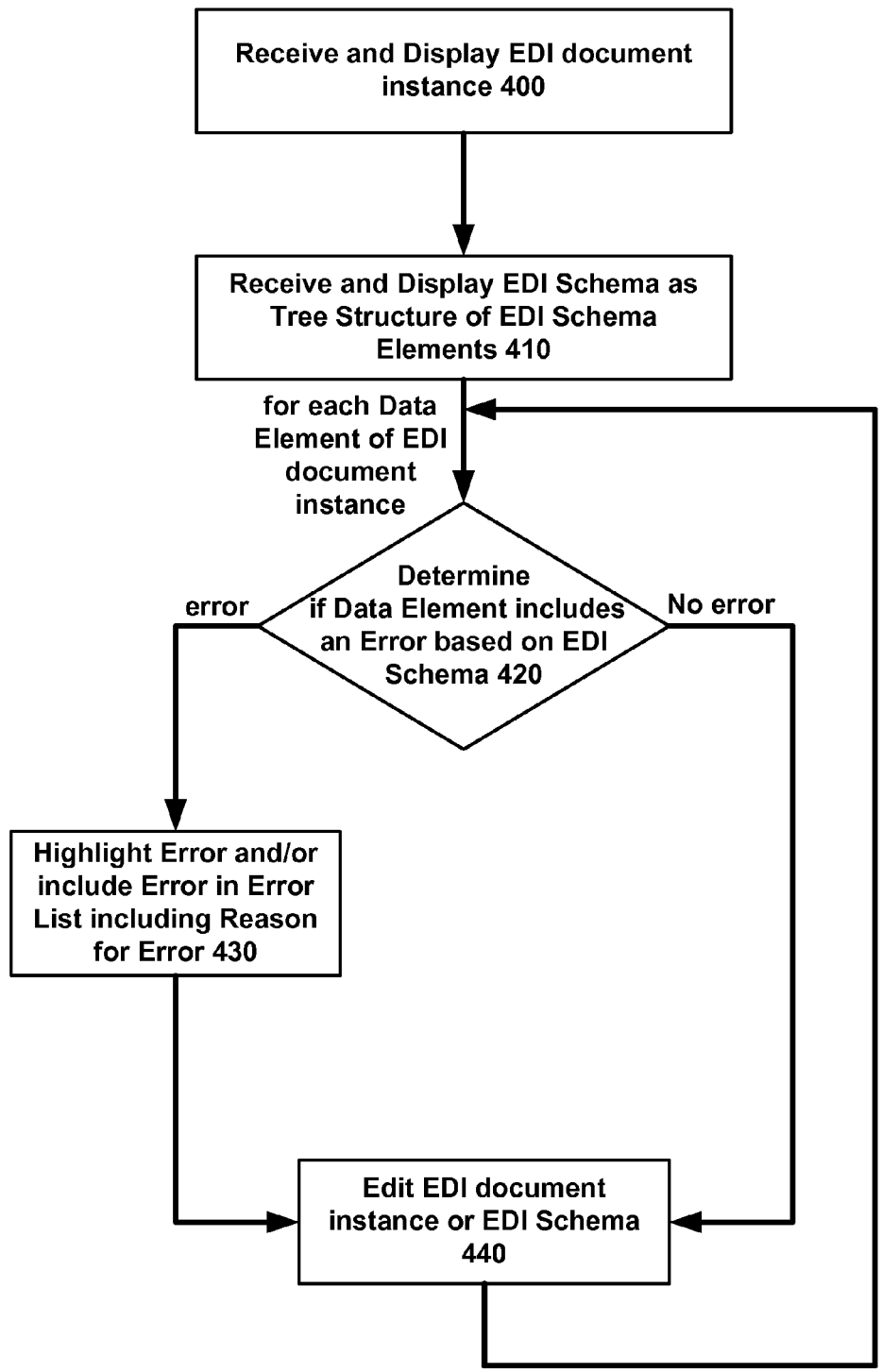
FIGS. 4 and 5 illustrate exemplary, non-limiting flow diagrams of processes for editing and generating EDI document instances in accordance with the invention.

FIG. 4 is a flow diagram of an exemplary non-limiting process for editing an EDI instance or EDI schema, and evaluating whether the EDI instance includes errors in accordance with the invention. At 400, an EDI document instance is received and displayed in a user interface portion of the tool of the invention. At 410, similarly, an EDI schema is received and displayed at 410. EDI document instances or EDI schema can be retrieved from anywhere and in any format in an EDI messaging system. Then, once an instance and a schema are matched, for each data element of the EDI document instance, it is determined if the data element includes an error based on an analysis of the EDI schema at 420. If there is an error, it may be highlighted or stored, along with reasons for the error. Then, at 440, a user might edit, e.g., fix one of the errors, either the EDI document instance or the EDI schema, in which case the flow proceeds back to 420 for a new EDI data element analysis.

Figure 5:
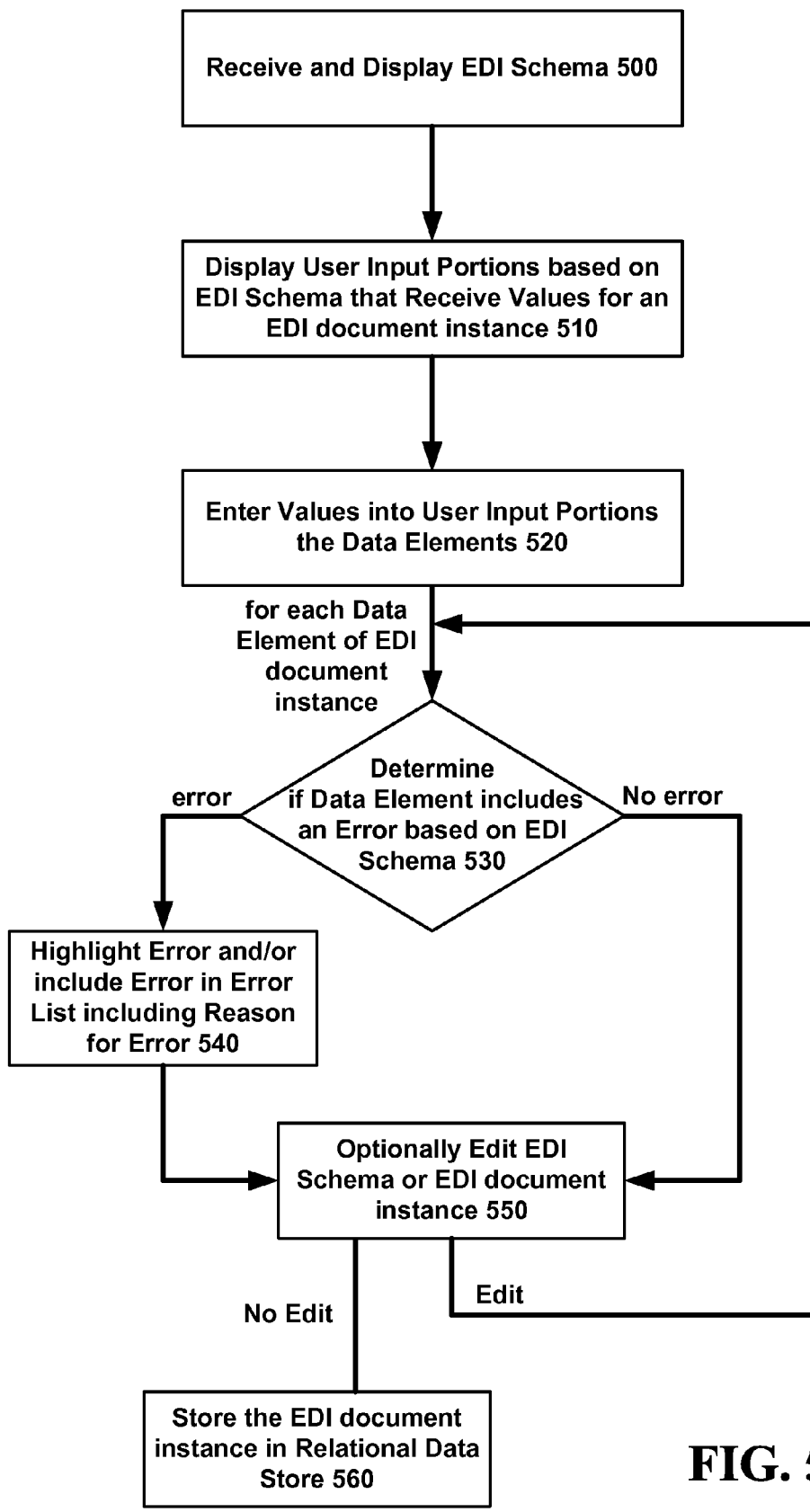

FIG. 5 is a flow diagram of an exemplary non-limiting process for creating an EDI instance based on an EDI schema, and evaluating whether the EDI instance includes errors in accordance with the invention. At 500, an EDI schema is received and displayed in a user interface portion of the tool of the invention. EDI schema can be retrieved from anywhere and in any format in an EDI messaging system. At 510, user input portions are displayed that allow a user to input values based on the EDI schema for a potential EDI document. At 520, values are received by the user input portions, which correspond to values for the data elements of the document instance being generated.

At 530, it is determined whether any of the data elements include errors based on the EDI schema. If there is an error, it may be highlighted or stored, along with reasons for the error. Then, at 550, the user may optionally edit the EDI schema, edit the EDI document instance generated, or generate another EDI document instance. If the user edits the EDI schema or EDI document instance, the data element analysis repeats at 530 for the new document or schema. If the user is finished, at 560, the generated document can be stored in the messaging system, consumed by an application, transmitted to a partner, etc.

In various non-limiting embodiments, the invention includes error reporting for reporting errors in the instances relative to an associated TSD. For instance, color coding and highlighting can be provided for error highlighting in the EDI instance representation itself, or the errors can be separately listed or otherwise displayed. Reasons for why any particular EDI data element includes an error can also be stored so that an editor using the editing tool can quickly determine what is wrong with a particular instance being edited or generated based on the TSD being applied.

Figure 6:
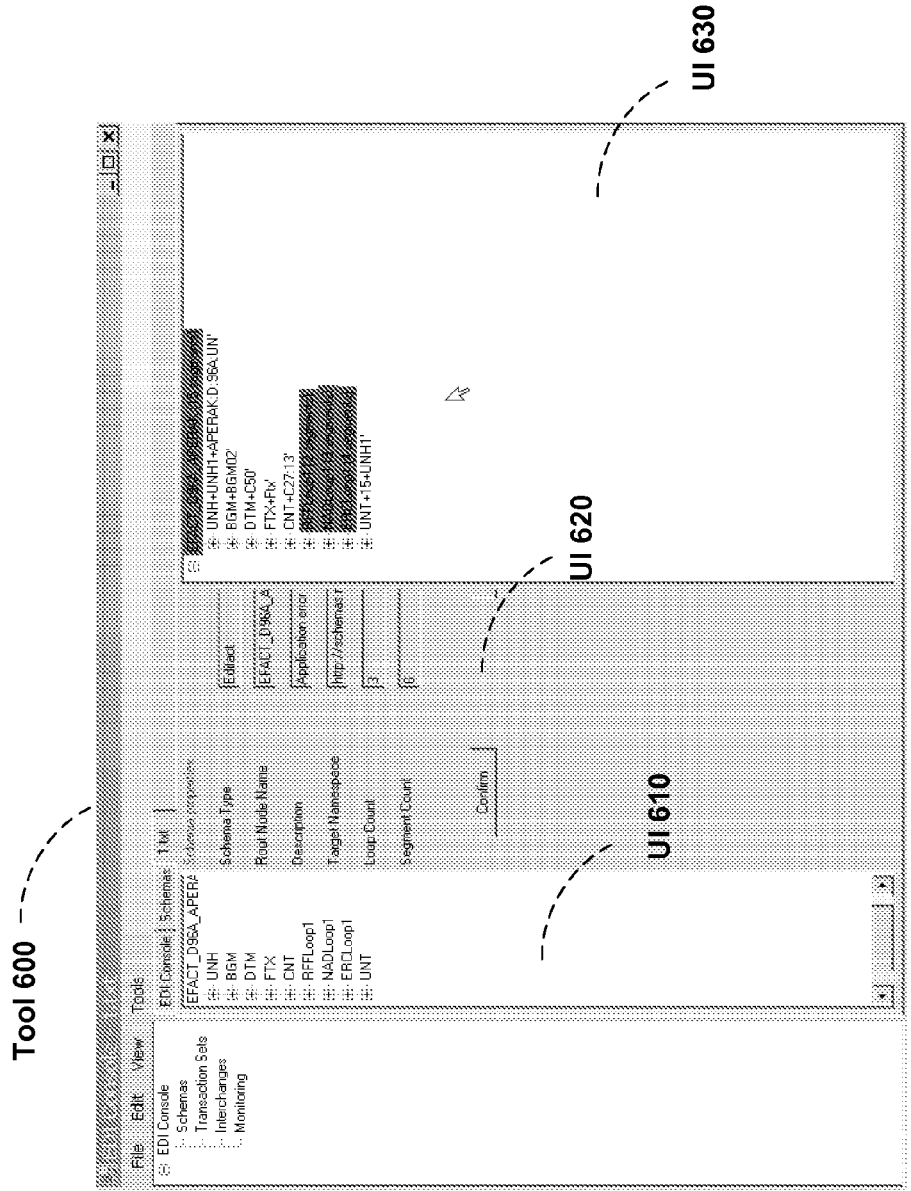
FIGS. 6, 7, 8, 9 and 10 illustrate exemplary aspects of the editing tool of the invention via a sequence of non-limiting screenshots that show typical interactions to edit or create an EDI document instance and/or schema in accordance with the invention.

Accordingly, based on a stored EDI schema definition, a user input section (generated based on the schema definition) allows a user to create instances of the schema definition. For instance, as shown by tool 600 of FIG. 6, a first UI portion 610 displays a tree structure of a selected EDI schema, a second UI portion 620 displays information about the schema, and a third UI portion 630 displays a UI portion having the tree structure defined by the schema for a potential EDI document. As mentioned, any instance, once generated, can also be edited to cover other scenarios as well, or to correct errors.

Figure 7:
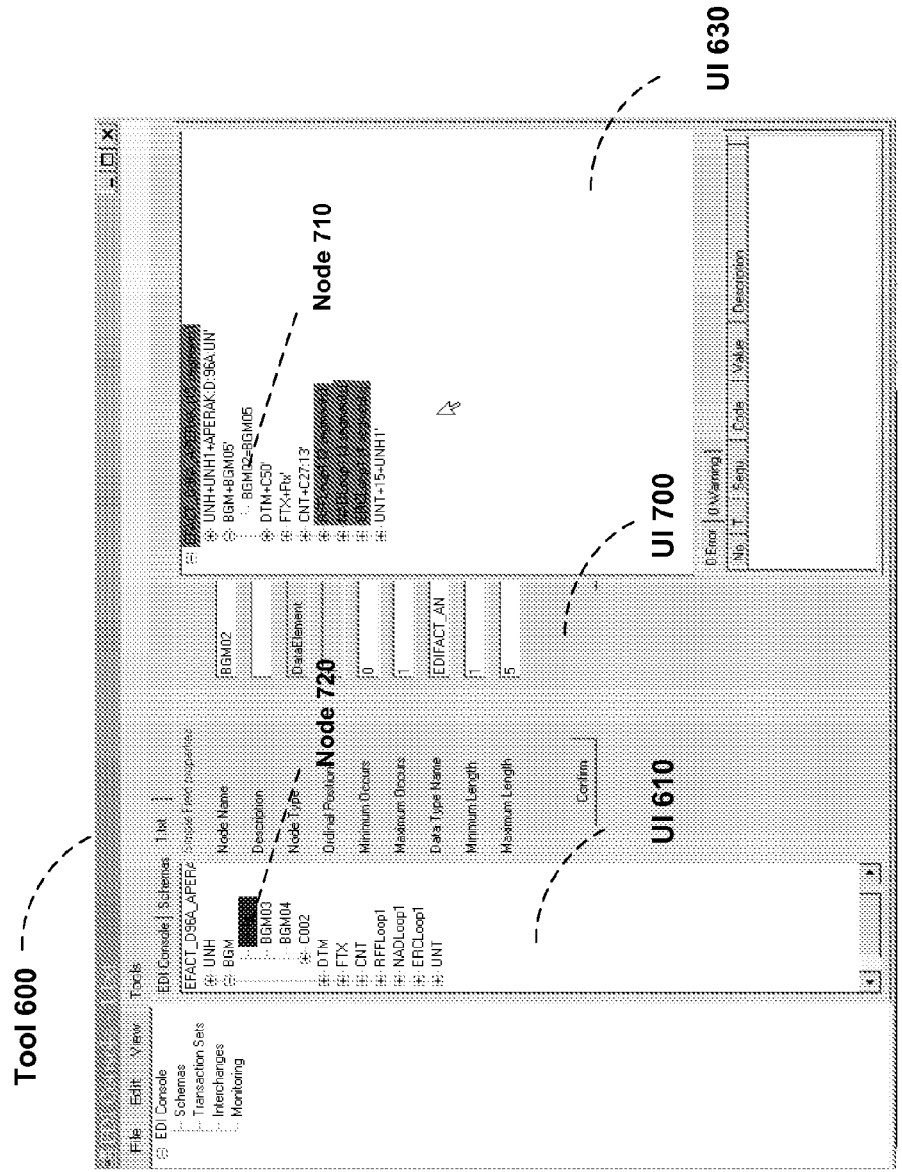

Thus, tool 600 also provides the capability to click on an element/node 710, e.g., BGM02, in the Transaction Set pane 630. As a result, the Definition node 720 becomes highlighted and provides context information in UI portion 700 about the types of rules that apply to node 720 for an instance of the node 710, i.e., BGM02. Accordingly, FIG. 7 illustrates that tool 600 can be used to interrelate an EDI Schema Definition with an instance being generated based on the Schema Definition.

Figure 8:
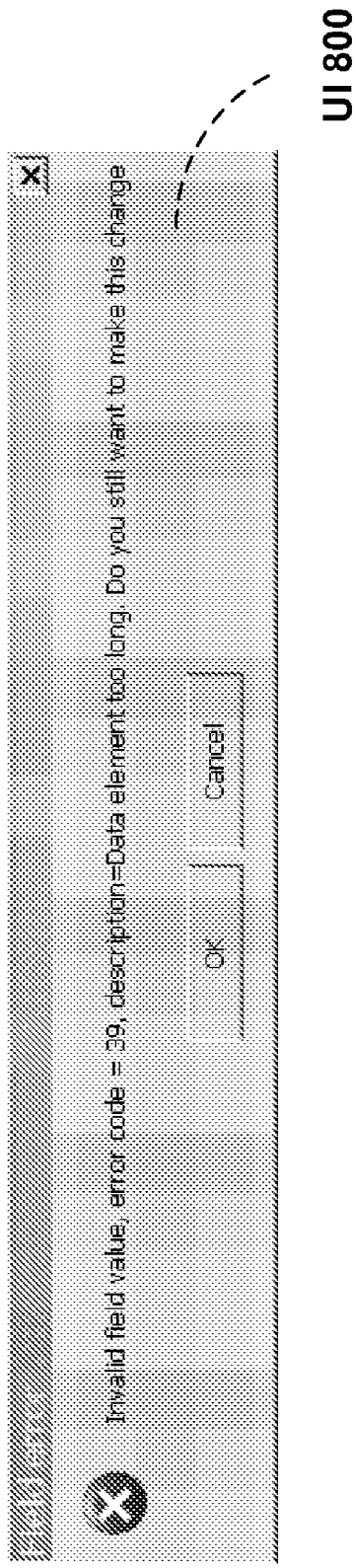

The invention also optionally supports error injection. For instance, if a user changes a defined maximum length via UI 700 from a defined maxLength of 5 to a defined maxLength of 6, the invention displays a warning such as illustrated by UI 800 of FIG. 8 including a warning dialog due to the variance of the value 6 with the Definition.

Figure 9:
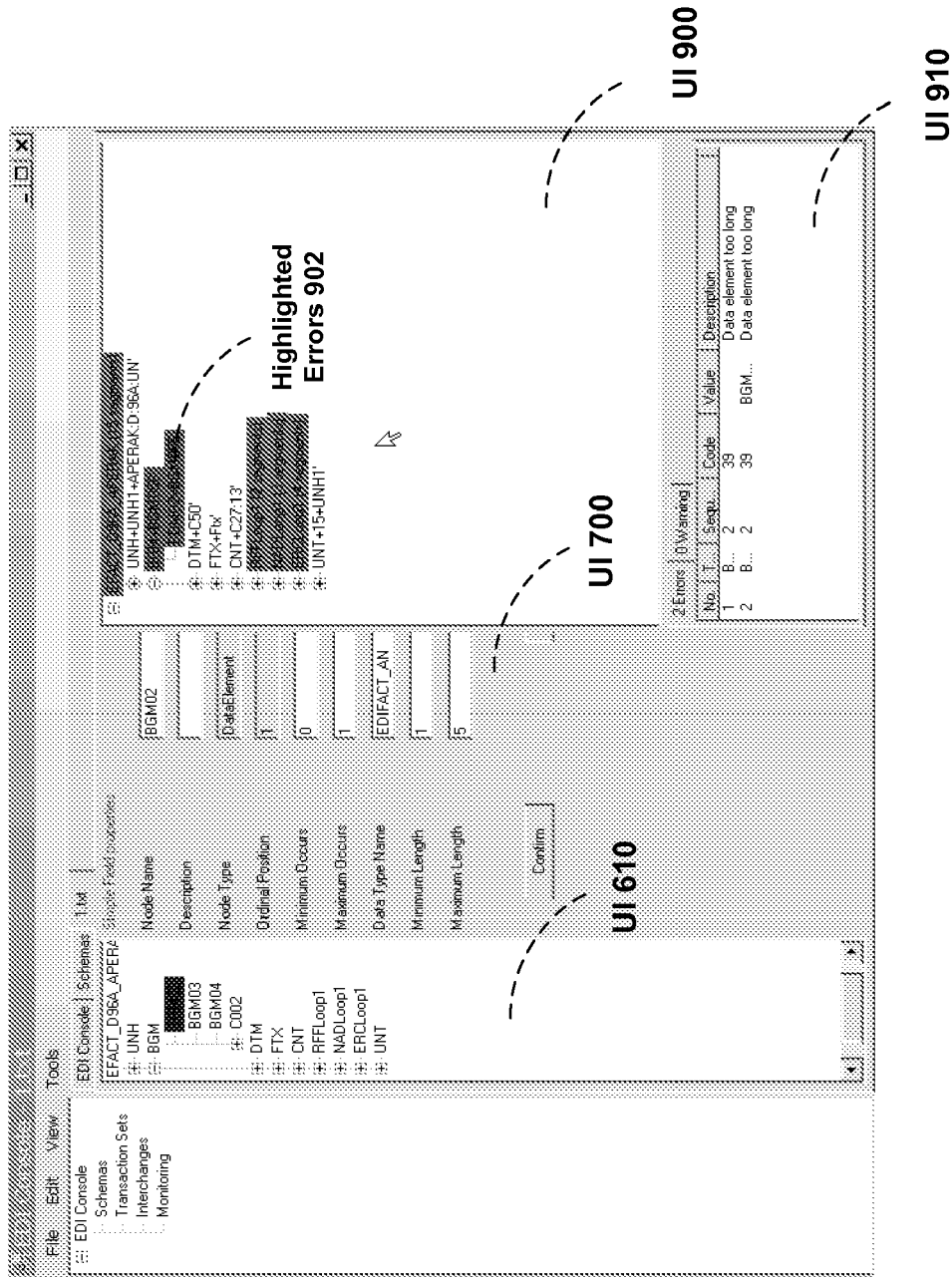

As shown by FIG. 9, Transaction Set Pane 900 may also include highlighted errors 902 on the nodes including errors. Moreover, an additional UI portion 910 may be displayed to show an error log associated with the EDI instance being editing. For instance, the errors can be displayed in UI portion 910 and can also be appropriately color coded in UI Portion 900 for the class (e.g., in red since an error).

Other manipulations that are supported are structural changes to Definitions and Transaction Sets as well and these include adding/moving segments, loops, etc. In this regard, the invention supports editing for two kinds of changes to a Schema: a change to a property and a change to the structure. For instance, a change to a property might be a change to the minimum number of occurrences, the maximum number of occurrences, or the name of the property. A change to the structure of the Schema might include insertion of a new child element, moving an existing child element from one position in the Schema to another, rearranging Loop order, etc.

Accordingly, the invention enables an EDI schema to be provided side by side with an EDI instance being generated or edited, allowing a user to clicks on an error from a list of errors, and the relevant parts of the instance and schema are automatically matched up via some visual indications on the user interface where the instance and schema are located on screen. This is shown in more detail via tool 1000 of FIG. 10. The schema is represented in UI portion 1010. The instance is represented in UI 1030. In non-limiting embodiments, the schema and instance are represented according to nodes of a hierarchical structure.

In accordance with the error highlighting of the invention, an error record 1042 can be selected in an error/warning UI 1040 including a reason 1044 for the error represented by the error record 1042, and then automatically, the node including the error or bad data 1032 is highlighted in UI portion 1030. Similarly, the node can be highlighted in the schema representation of UI portion 1010. As a result, the error information is conveyed with respect to the data elements of the EDI tree structures being affected by the error, so that a user might easily edit the bad data to make a valid EDI document based on the schema.

Figure 10:
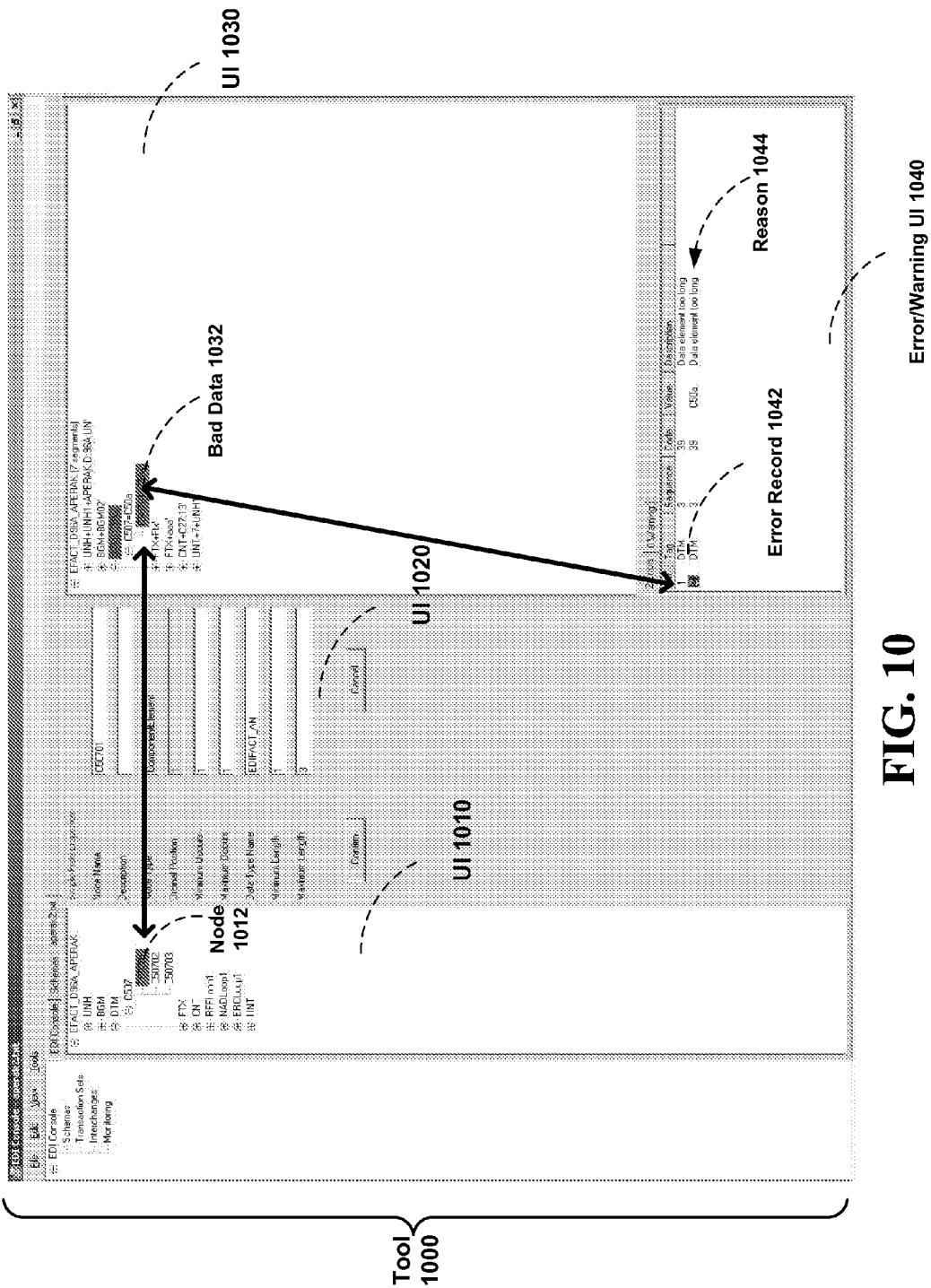

It is noted in the error pane 1040 of FIG. 10 that there is an error for value 'C50a' because it is too long. In this regard, clicking on the error highlights the instance node 1032 with the bad data and the corresponding schema node 1012 of schema pane 1010. In addition, the schema node as represented in schema node context pane UI 1020 displays that the maximum allowed length is 3, whereas the instance has 4 as a value and hence the reason for the error. This error reason is also recorded and displayed for an error log generated for the affected node of the EDI document.

In addition, as an optional part of validation, in an exemplary, non-limiting implementation of the invention, any instance nodes that have errors are highlighted in with a particular color, e.g., red. So, DTM+C50a' and C50701=C50a node elements are highlighted in FIG. 10. In an alternate embodiment, the latter C50701=C50a node shows in a different color as the user has selected this node for inspection.

Supplemental Context Regarding EDI Messaging Systems

EDI is the exchange of structured information, by agreed upon messaging standards, from one computer or computer application to another by electronic means with minimal human intervention. Based on approved formatting standards and schemas, EDI is one of the ways businesses exchange computer-to-computer business information. For example, millions of companies around the world transmit and store data associated with business transactions (e.g., purchase orders, shipping/air bills, invoices, or the like) using EDI to conduct commerce.

EDI may thus be defined as computer-to-computer exchange of business information using 'approved' formatting standards, referring to specific interchange methods agreed upon by national or international standards bodies for the transfer of business transaction data. One typical application for EDI messaging is the automated purchase of goods and services, though EDI messages are by no means limited to any particular kind of business data. In this regard, millions of companies around the world use EDI to conduct commerce. In raw format, EDI data is transmitted as delimited files (without self describing tags) and therefore the encoding rules enforce very strict formatting rules to ensure the destination application is able to successfully parse and consume the information for down stream processing.

Organizations that send or receive documents from each other are referred to as "trading partners" in EDI terminology. The trading partners agree on the specific information to be transmitted and how it should be used. Service providers provide global platforms (also known as trading grids) to connect and integrate "business partners" around the world. They provide integration platforms that make the exchange of EDI (or XML) documents transparent and easy between diverse constituents. These providers also track and reconcile documents to reduce errors and improve supply chain performance.

EDI translation software provides the interface between the internal system and the common standards and applies to both "inbound" documents and "outbound" documents. Translation software may also utilize other methods or file formats translated to or from EDI.

It can be appreciated by those of skill in the art that the structured information of EDI files can also be represented with the extensible markup language (XML), and vice versa. Despite the use of EDI being somewhat unheralded relative to its counterpart XML, EDI files are still the data format used in a majority of electronic commerce transactions in the world.

Figure 11:
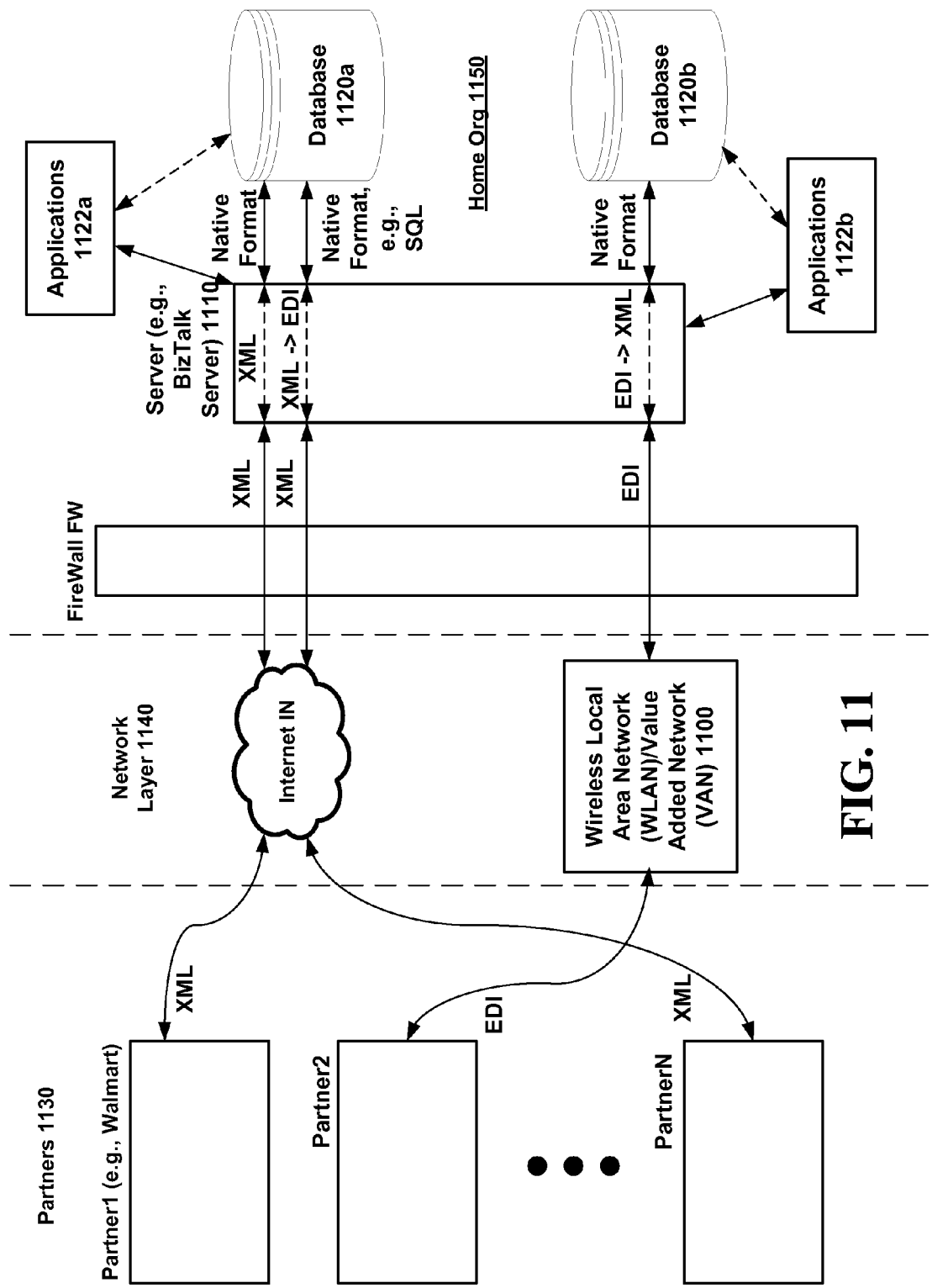
FIG. 11 is an exemplary block diagram of a representative EDI communications system between a home organization having a server and the trading partners of the home organization.

In the exemplary EDI system for a home organization 1150 shown in FIG. 11, typically server software, such as Microsoft's BizTalk Server 1110 can be deployed to interact outside of the home organization 1150 via network layer 1140 and to interface with databases 1120a, 1120b, etc. so that various applications 1122a, 1122b, etc., can interact with the automated storage of business records received by databases 1120a, 1120b, etc. EDI files or XML representations of EDI files can be received via Internet IN, or a wireless local area network (WLAN) or value added network (VAN) 1100 of network layer 1140, e.g., through firewall FW, and such EDI/XML messages can be received from any of a variety of trading partners 1130, i.e., partner1, partner2, . . . , partnerN. Server 1110 can handle any of the necessary conversions and parsing of EDI files or XML representations thereof, and any conversions to or from a native database format, such as SQL.

Typically, when an EDI messages are received, a server receiving the EDI messages can answer in terms of an acknowledgment of receipt of the EDI messages to its trading partner. The server will specify whether the EDI message is invalid according to the schema, and if invalid, will specify why, or the server will specify that the EDI message was accepted, accepted with errors or rejected.

Internet IN has enabled EDI transactions to be transmitted between trading partners in an even more efficient manner. Internet IN provides business and government agencies with an environment that is open, fast, cost effective, and widely accepted and used.

VAN 1100 is a mechanism that facilitates the transfer of electronic data between trading partners. A VAN 1100 can be thought of as a post office, or a dedicated pipe, that allows an entity to send EDI formatted data to one of their trading partners at any time. The VAN 1100 will hold the file of transmitted transactions until the trading partner to whom it is addressed retrieves it at a later time.

The EDI standards were designed to be independent of lower level technologies and can be transmitted using Internet protocols, such as the file transfer protocol (FTP), telnet and email, as well as private networks, such as value-added networks (VANs). EDI documents contain the same data that would normally be found in a paper document used for the same organizational function. For example, an EDI ship-from-warehouse order might be used by a manufacturer to tell a warehouse to ship product(s) to a retailer. It typically has a ship to address, bill to address, a list of product numbers (e.g., a UPC code) and quantities. It may also have other information if the parties agree to include it. However, EDI is not confined to just business data directly related to trade, rather but encompasses all fields such as medicine (patient records, laboratory results, etc.), transport (container and modal information, etc.), engineering and construction, etc., i.e., anywhere a first entity may wish to automate the exchange of data with another entity.

In a typical EDI transaction model, a large business entity or an EDI integration broker trades with numerous partners and has the technical capability to handle numerous EDI transaction data in various EDI formats and schemas. These entities, also known as "hubs," transact with one or more suppliers, also known as "spokes." Each of the spokes typically is a relatively small business entity that is only capable of dealing with one hub.

Before the spokes attempt to initiate transactions via EDI with the hub, the hub typically transmits various EDI schemas to the spokes so that the spokes can properly format the EDI transactions according to the EDI schemas.

Figure 12:
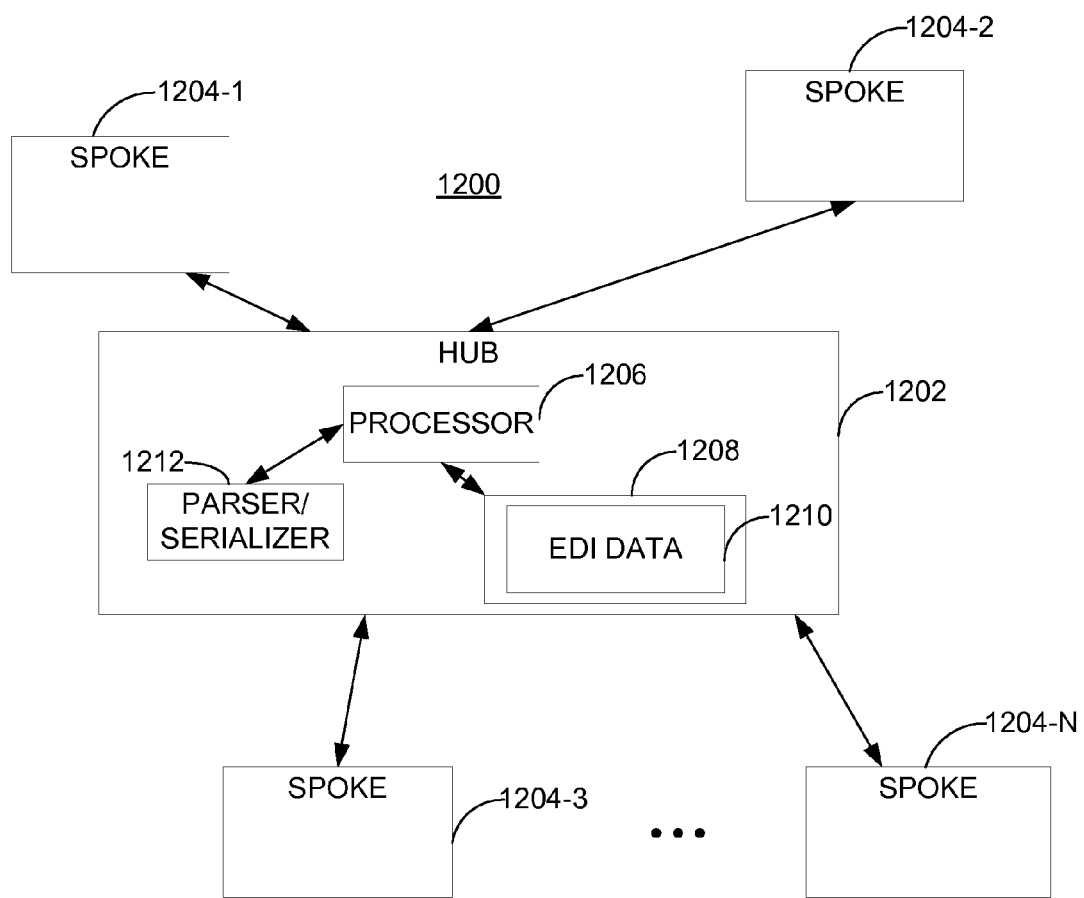
FIG. 12 is an exemplary block diagram of a representative EDI system including a hub and spoke architecture.
Figure 16:
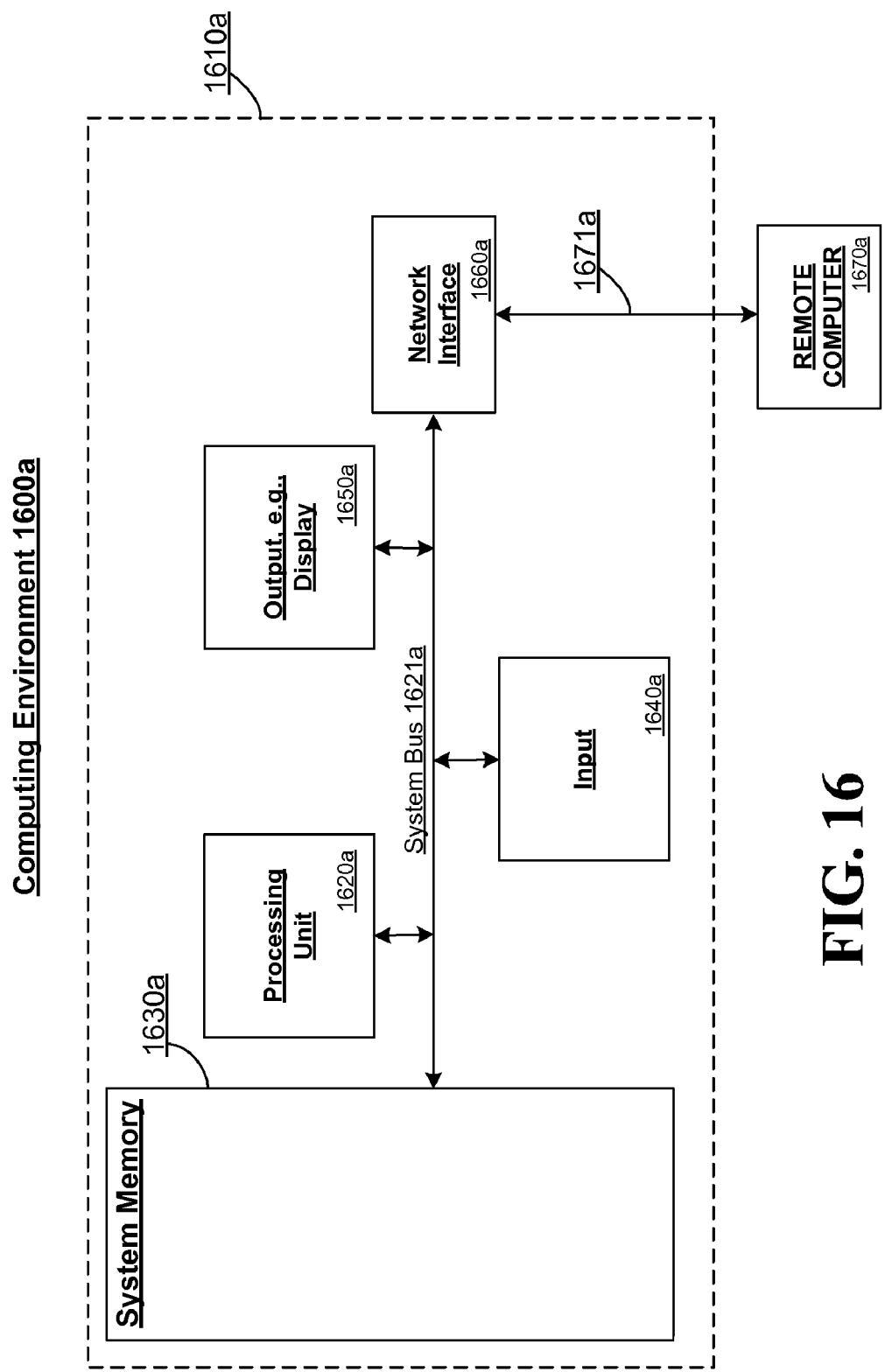
FIG. 16 is a block diagram representing an exemplary non-limiting computing system or operating environment in which the present invention may be implemented.

FIG. 12 is a block diagram illustrating a system for conducting EDI transactions according to exemplary non-limiting embodiments of the invention. A system 1200 is illustrated for conducting EDI transactions. System 1200 includes a hub 1202 linked to and communicating with one or more spokes (e.g., spokes 1204-1, 1204-2, 1204-3, . . . , 1204-N). In one embodiment, the hub 1202 includes a server computer or a computing device serving one or more processors (e.g., processor 1206) or processing units for executing computer-executable instructions for serving the spokes 1204. In one example, the spokes 1204 include a computing device having one or more components included in or coupled with a computer 1230, as shown in FIG. 16.

In one example, the hub 1202 also includes a memory area 1208 for storing one or more EDI schemas, such as an EDI schema 1210. Initially, the hub 1202 and the spokes 1204-1, 1204-2, 1204-3, . . . , 1204-N establish agreements as to the EDI formats or standards to be used for transmitting transaction data therebetween. Once the parties determine the particular EDI formats or standards to use, the hub 1202 selects the appropriate EDI schemas to be transmitted to the spokes 1204-1, 1204-2, 1204-3, . . . , 1204-N. In another example, the hub 1202 may choose to select all EDI schemas for all types of transactions, such as purchase orders, bills of lading, invoices, payrolls, or the like, to the spokes 1204-1, 1204-2, 1204-3, . . . , 1204-N.

Although the communications between the hub 1202 and the spokes 1204-1, 1204-2, 1204-3, . . . , 1204-N can be a private or public communications network, a wired or wireless network, the spokes 1204-1, 1204-2, 1204-3, . . . , 1204-N typically lack the hardware resources to handle large amount of EDI schemas sent from the hub 1202. In addition, the type and bandwidth of computing network communications for the spokes 1204-1, 1204-2, 1204-3, . . . , 1204-N are not equipped to handle such demand imposed by the thousands of EDI schemas, which can reach several Gigabytes in data size.

Figure 13:
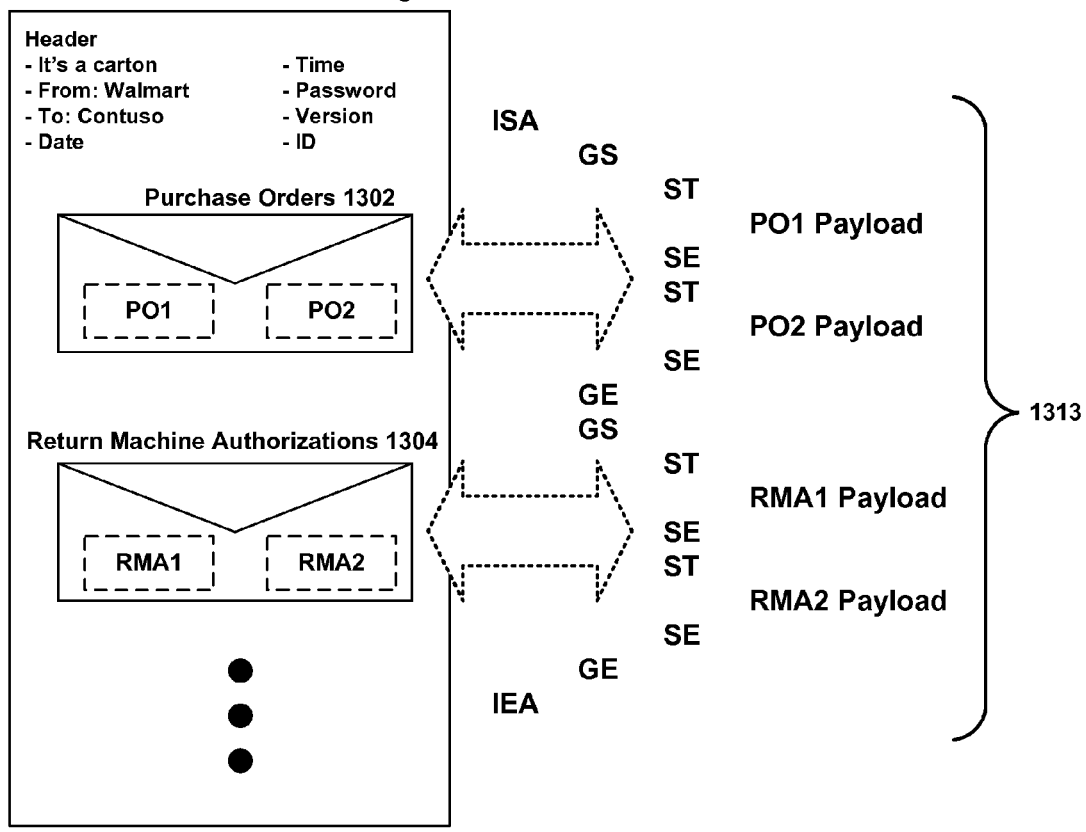
FIG. 13 is an exemplary block diagram representative of an interchange data structure including a plurality of EDI transactions.

FIG. 13 in turn illustrates that an organization can generate an interchange 1300—a sort of carton for EDI messages—which includes a plurality of EDI messages. Interchange 1300 typically includes a header which includes a type of document, from whom the document originated, to whom the document is addressed, the date, the time, any password information, version information, identification information, and the like. Then the interchange 1300 lists a series of purchase orders 1302 and return machine authorizations (RMAs) 1304, conceptually shown as envelopes in the carton. In turn, each envelope conceptually represents one or more individual EDI files, or messages. For instance, purchase orders 1302 include individual purchase orders PO1 and PO2, and RMAs 1304 include RMAs RMA1 and RMA2, and so on.

In turn, there is a flat file native EDI format that corresponds to this conceptual relationship between carton->envelopes->messages. As illustrated by shell 1313 corresponding to the conceptual representation, the ISA <-> IEA indent level represents the beginning and end of the interchange (carton). The GS and GE indent levels represent the beginning and end of any envelopes within the carton, and the ST and SE indent levels represent the beginning and end of any messages within an envelope, i.e., in between any ST and SE will be an individual message payload, such as PO1 Payload, PO2 Payload, RMA1 Payload and RMA2 Payload.

There are several advantages of using EDI all of which provide distinct benefits to the user. One of the most notable benefits to using EDI is the time-saving capability it provides. By eliminating the process of distributing hard copies of information throughout the company, easy access to electronic data simplifies inter-department communication. Also, another time-savings advantage is the ability to track the origin of all information therefore significantly reducing time spent on corresponding with the source of the information.

Another benefit for the user of this information system is the ultimate savings in costs for an organization. Although the initial set-up costs may seem high, the overall savings received in the long run ensures its value. For any business, regardless of its size, hard-copy print outs and document shipping costs add up. EDI allows for a paper-less exchange of information reducing handling costs and worker productivity that is involved with the organization of paper documents.

EDI has another strong advantage over paper-based information exchange, which has to do with accuracy of information. When the information is already stored electronically, it speeds up an organizations ability to check for accuracy and make any necessary corrections as the data is already input to the system. Also, unlike paper-based methods, EDI allows for the ability to send and receive information at any time thereby tremendously improving an organizations ability to communicate quickly and efficiently.

A disadvantage of using EDI involves the initial set-up. The preliminary expenses and time that arise from the implementation, customization and training can be costly. However, as EDI systems continue to improve, such as by using the batching membership evaluation techniques of the invention, such disadvantage is disappearing as ease of use increase.

Edifact and X12 Standards for EDI Documents

There are two major sets of EDI standards which can be used to generate and receive/process EDI messages: the United Nations Electronic Data Interchange for Administration, Commerce and Transport, which is a translation of UN/EDIFACT ("EDIFACT") and the American National Standards Institute's (ANSI) Accredited Standards Committee (ASC) X12 ("X12"). Both used worldwide, X12 tends to be more popular in North America than EDIFACT. These standards prescribe the formats, character sets, and data elements used in the exchange of documents and forms, such as invoices and purchase orders, e.g., purchase orders are called "ORDERS" in EDIFACT and "850s" in X12.

Whichever selected, the standard dictates which pieces of information are mandatory for a particular document, which pieces are optional and gives the rules for the structure of the document. In this regard, with optional pieces, two EDI documents can follow the same standard and contain different sets of information. For example, a food company might indicate a particular product expiration date while a clothing manufacturer might choose to send color and size information.

For illustrative purposes only, the following is an example EDIFACT message, for instance, that might be used to answer to a product availability request:

UNB+IATB:1+6XPPC+LHPPC+VV40101:0VV50+1'
UNH+1+PAORES:VV3:1:IA'
MSG+1:45'
IFT+3+?*XYZCOMPANY AVAILABILITY?*'
ERC+A7V:1:AMD'
IFT+3+NO MORE FLIGHTS'
ODI'
TVL+2404VV3:1000::1220+FRA+JFK+DL+400+C'
PDI++C:3+Y::3+F::1'
APD+74C:0:::6++++++6X'
TVL+2404VV3:1740::2030+JFK+MIA+DL+081+C'
PDI++C:4'
APD+EM2:0:1630::6+++++++DA'
UNT+13+1'
UNZ+1+1' wherein the following symbols have the following meanings:

' is a segment terminator;
+ is a data element separator;
: is a component data element separator;
* is a repetition separator; and
? is a release character.

To explain the information contained in some of the above segments, the segment of the above exemplary EDI file designated by "UNH+1+PAORES:VV3:1:IA'" is the header segment. A header segment is required at the start of every EDI message. With this particular file segment, the message name and version is specified as PAORES VV3 revision 1 and it was defined by the organization IATA. The segment of the above exemplary EDI file designated by "IFT+3+NO MORE FLIGHTS'" is an 'Interactive Free Text' segment containing the text 'NO MORE FLIGHTS.' The segment of the above exemplary EDI file designated by "UNT+13+1'" is the tail segment, whereby it is indicated that the message sent contains 13 segments.

EDIFACT files have a hierarchical structure. The top level element is referred to a message. A message is a sequence of groups and segments. A group or segment can be mandatory (M) or conditional (C) and can be specified to repeat, for example CVVVV would indicate between 0 and VVVV repetitions of a segment or group, whereas MVVVV would mean between 1 and VVVV repetitions.

A group, like a message, is a sequence of segments or groups. The first segment/group beneath a group must be mandatory. If the logic of the situation demands it is conditional, then the group itself should be made conditional instead.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with processes for editing EDI documents in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for editing EDI documents of the invention.

Figure 15:
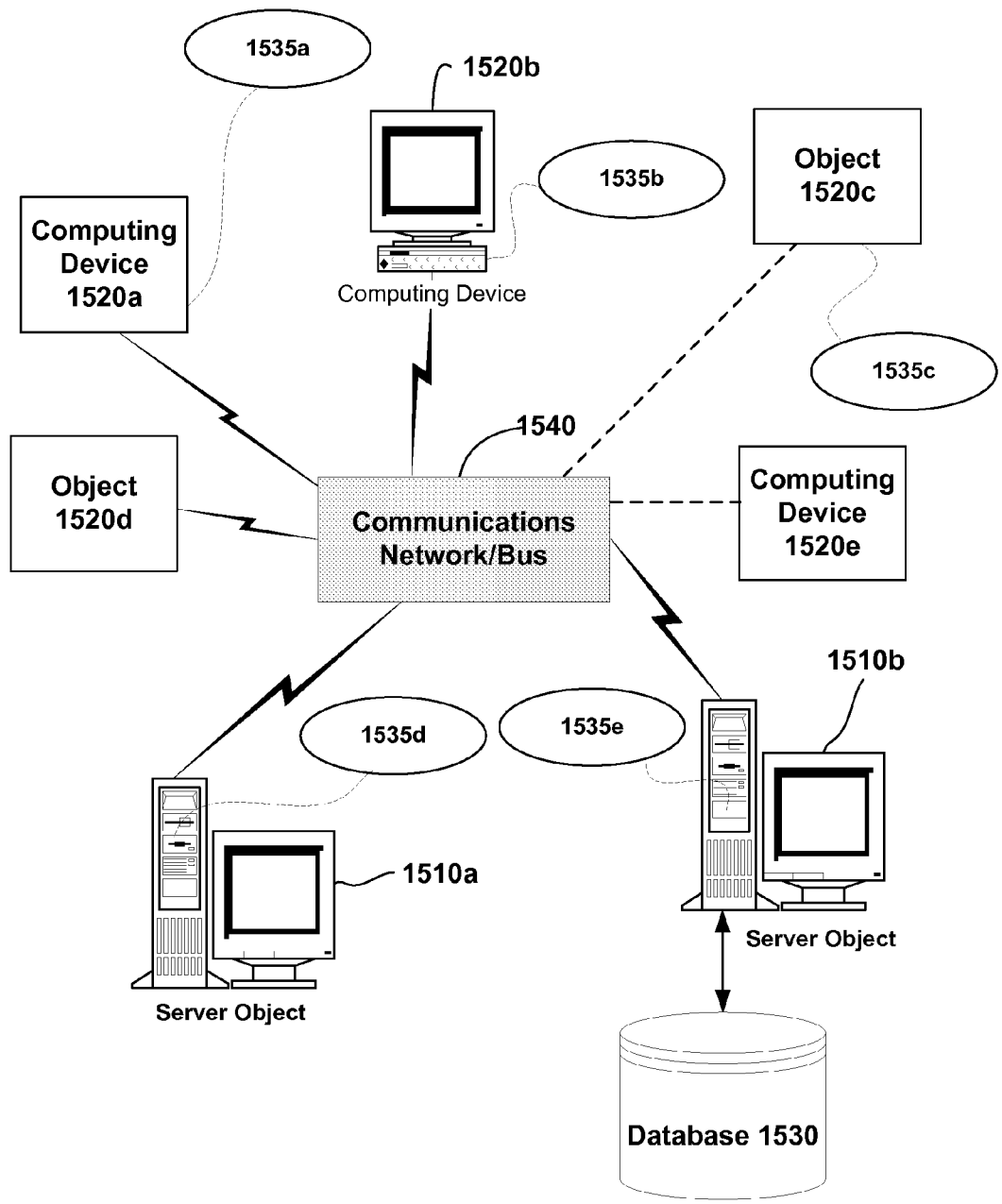
FIG. 15 is a block diagram representing an exemplary non-limiting networked environment in which the present invention may be implemented.

FIG. 15 provides a schematic diagram of an exemplary networked or distributed computing environment. The distributed computing environment comprises computing objects 1510a, 1510b, etc. and computing objects or devices 1520a, 1520b, 1520c, 1520d, 1520e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 1540. This network may itself comprise other computing objects and computing devices that provide services to the system of FIG. 15, and may itself represent multiple interconnected networks. In accordance with an aspect of the invention, each object 1510a, 1510b, etc. or 1520a, 1520b, 1520c, 1520d, 1520e, etc. may contain an application that might make use of an API, or other object, software, firmware and/or hardware, suitable for use with the systems and methods for editing EDI documents in accordance with the invention.

It can also be appreciated that an object, such as 1520c, may be hosted on another computing device 1510a, 1510b, etc. or 1520a, 1520b, 1520c, 1520d, 1520e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to editing EDI documents according to the present invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 15, as an example, computers 1520a, 1520b, 1520c, 1520d, 1520e, etc. can be thought of as clients and computers 1510a, 1510b, etc. can be thought of as servers where servers 1510a, 1510b, etc. maintain the data that is then replicated to client computers 1520a, 1520b, 1520c, 1520d, 1520e, etc., although any computer can be considered a client, a server, or both, depending on the circumstances. Any of these computing devices may be processing data or requesting services or tasks that may implicate the editing of EDI documents in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for editing EDI documents of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 15 illustrates an exemplary networked or distributed environment, with server(s) in communication with client computer (s) via a network/bus, in which the present invention may be employed. In more detail, a number of servers 1510a, 1510b, etc. are interconnected via a communications network/bus 1540, which may be a LAN, WAN, intranet, GSM network, the Internet, etc., with a number of client or remote computing devices 1520a, 1520b, 1520c, 1520d, 1520e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to create or edit EDI documents.

In a network environment in which the communications network/bus 1540 is the Internet, for example, the servers 1510a, 1510b, etc. can be Web servers with which the clients 1520a, 1520b, 1520c, 1520d, 1520e, etc. communicate via any of a number of known protocols such as HTTP. Servers 1510a, 1510b, etc. may also serve as clients 1520a, 1520b, 1520c, 1520d, 1520e, etc., as may be characteristic of a distributed computing environment.

As mentioned, communications may be wired or wireless, or a combination, where appropriate. Client devices 1520a, 1520b, 1520c, 1520d, 1520e, etc. may or may not communicate via communications network/bus 14, and may have independent communications associated therewith. For example, in the case of a TV or VCR, there may or may not be a networked aspect to the control thereof. Each client computer 1520a, 1520b, 1520c, 1520d, 1520e, etc. and server computer 1510a, 1510b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 1510a, 1510b, 1520a, 1520b, 1520c, 1520d, 1520e, etc. may be responsible for the maintenance and updating of a database 1530 or other storage element, such as a database or memory 1530 for storing data processed or saved according to the invention. Thus, the present invention can be utilized in a computer network environment having client computers 1520a, 1520b, 1520c, 1520d, 1520e, etc. that can access and interact with a computer network/bus 1540 and server computers 1510a, 1510b, etc. that may interact with client computers 1520a, 1520b, 1520c, 1520d, 1520e, etc. and other like devices, and databases 1530.

Exemplary Computing Device

As mentioned, the invention applies to any device wherein it may be desirable to create or edit EDI documents based on a schema definition. It should be understood, therefore, that handheld, portable and other computing devices and computing objects of all kinds are contemplated for use in connection with the present invention, i.e., anywhere that a device may create or edit EDI documents or otherwise receive, process, transmit or store EDI data. Accordingly, the below general purpose remote computer described below in FIG. 16 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 16 thus illustrates an example of a suitable computing system environment 1600a in which the invention may be implemented, although as made clear above, the computing system environment 1600a is only one example of a suitable computing environment for a media device and is not intended to suggest any limitation as to the scope of use or functionality of the invention. Neither should the computing environment 1600a be interpreted as having any dependency or requirement relating to any one or combination of components illustrated in the exemplary operating environment 1600a.

With reference to FIG. 16, an exemplary remote device for implementing the invention includes a general purpose computing device in the form of a computer 1610a. Components of computer 1610a may include, but are not limited to, a processing unit 1620a, a system memory 1630a, and a system bus 1621a that couples various system components including the system memory to the processing unit 1620a. The system bus 1621a may be any of several types of bus structures including a memory bus or memory controller, a peripheral bus, and a local bus using any of a variety of bus architectures.

Computer 1610a typically includes a variety of computer readable media. Computer readable media can be any available media that can be accessed by computer 1610a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1610a. Communication media typically embodies computer readable instructions, data structures, program modules or other data in a modulated data signal such as a carrier wave or other transport mechanism and includes any information delivery media.

The system memory 1630a may include computer storage media in the form of volatile and/or nonvolatile memory such as read only memory (ROM) and/or random access memory (RAM). A basic input/output system (BIOS), containing the basic routines that help to transfer information between elements within computer 1610a, such as during start-up, may be stored in memory 1630a. Memory 1630a typically also contains data and/or program modules that are immediately accessible to and/or presently being operated on by processing unit 1620a. By way of example, and not limitation, memory 1630a may also include an operating system, application programs, other program modules, and program data.

The computer 1610a may also include other removable/non-removable, volatile/nonvolatile computer storage media. For example, computer 1610a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1621a through a non-removable memory interface such as an interface, and a magnetic disk drive or optical disk drive is typically connected to the system bus 1621a by a removable memory interface, such as an interface.

A user may enter commands and information into the computer 1610a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1620a through user input 1640a and associated interface(s) that are coupled to the system bus 1621a, but may be connected by other interface and bus structures, such as a parallel port, game port or a universal serial bus (USB). A graphics subsystem may also be connected to the system bus 1621a. A monitor or other type of display device is also connected to the system bus 1621a via an interface, such as output interface 1650a, which may in turn communicate with video memory. In addition to a monitor, computers may also include other peripheral output devices such as speakers and a printer, which may be connected through output interface 1650a.

The computer 1610a may operate in a networked or distributed environment using logical connections to one or more other remote computers, such as remote computer 1670a, which may in turn have media capabilities different from device 1610a. The remote computer 1670a may be a personal computer, a server, a router, a network PC, a peer device or other common network node, or any other remote media consumption or transmission device, and may include any or all of the elements described above relative to the computer 1610a. The logical connections depicted in FIG. 16 include a network 1671a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1610a is connected to the LAN 1671a through a network interface or adapter. When used in a WAN networking environment, the computer 1610a typically includes a communications component, such as a modem, or other means for establishing communications over the WAN, such as the Internet. A communications component, such as a modem, which may be internal or external, may be connected to the system bus 1621a via the user input interface of input 1640a, or other appropriate mechanism. In a networked environment, program modules depicted relative to the computer 1610a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the tools for editing EDI documents in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for editing EDI documents of the invention. The invention contemplates the use of the invention from the standpoint of an API (or other software object), as well as from a software or hardware object that receives EDI documents to be edited in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to create or edit EDI documents. For instance, the TSD-based EDI document editing tool of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the editing capabilities of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture", "computer program product" or the like where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 4 and 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers ... ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for editing EDI instances based on a TSD. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for editing electronic data interchange (EDI) messages, including:
   retrieving from storage at least one EDI message instance and displaying the retrieved at least one EDI message instance in a first user interface portion, wherein the EDI message is displayed in a hierarchical tree structure;
   displaying at least one EDI schema corresponding to the at least one EDI message instance in a second user interface portion, the second user interface portion including at least three simultaneously viewable and discrete sections, the at least three discrete sections including:
      a first section displaying a hierarchical tree structure of the at least one EDI schema, wherein the nodes of the hierarchical tree structure of the at least one EDI schema correspond to the associated nodes of a hierarchical tree structure of the EDI message instance;
      a second section displaying information about the at least one EDI schema; and
      a third section displaying a tree structure defined by the EDI schema for the at least one EDI message;
   displaying in a third user interface portion an error and warning pane within which is displayed selectable errors and warnings;
   upon selecting a particular error or warning in the error and warning pane, causing a corresponding node within the hierarchical tree structure of the at least one EDI schema and a corresponding node within the hierarchical tree structure of the EDI message instance to be selected and highlighted; and
   after retrieving the at least one EDI message instance from storage, modifying
   (A) at least one EDI data element of the at least one EDI message instance; and
   (B) at least one EDI schema element of the at least one EDI schema.

2. The method of claim 1, further comprising:
   determining at least one invalid EDI data element instance of the at least one EDI message instance based on analyzing the at least one EDI schema element of the at least one EDI schema.

3. The method of claim 2, further comprising:
   displaying at least one indication of the at least one invalid EDI data element instance.

4. The method of claim 2, wherein said determining includes determining at least one reason why the at least one invalid EDI data element instance does not conform to the at least one EDI schema.

5. The method of claim 4, further comprising:
   displaying at least one indication of the at least one invalid EDI data element instance and the corresponding at least one reason in a third user interface portion.

6. The method of claim 1, wherein said displaying of the at least one EDI schema includes displaying a plurality of hierarchically related EDI schema elements including at least one of a data type, simple data element, composite data element, segment or loop comprising the at least one EDI schema.

7. The method of claim 1, wherein said modifying includes modifying at least one EDI schema element of the at least one EDI schema.

8. The method of claim 7, further comprising:
   displaying at least one indication of the at least one invalid EDI data element of the at least one EDI message instance that becomes invalid as a result of said modifying of the at least one EDI schema element.

9. The method of claim 1, further comprising:
   where the modifying includes modifying the at least one EDI message instance, determining if the modifying results in at least one invalid EDI data element based on analyzing the at least one EDI schema.

10. The method of claim 9, further comprising:
    generating a warning where said modifying results in at least one invalid EDI data element in the EDI message instance.

11. The method of claim 1, further comprising:
    where the modifying includes modifying the at least one EDI message instance, storing the modified EDI data elements of the at least one EDI message instance in a relational data store, and wherein the first and second interface portions are simultaneously displayed in different portions of a same user interface application.

12. A computer readable storage device having stored thereon computer executable instructions that, when executed by a processor of a computing system, cause the computing system to perform the method of claim 1.

13. A computing device comprising:
a processor;
a computer readable storage device having stored thereon computer executable instructions for performing the method of claim 1; and
a display device in communication with the processor.

14. A computing subsystem of an electronic data interchange (EDI) communications system for transmitting and receiving EDI messages, including:
at least one computer storage device having stored thereon:
an EDI document generator including:
(i) a first user interface component that displays a specified at least one EDI schema definition in accordance with a tree structure,
(ii) a second user interface component that displays at least one user input portion that receives at least one value for input to at least one EDI data element of at least one EDI document to be generated based on the at least one EDI schema definition,
(iii) a third user interface component that displays the at least one EDI document in a hierarchical tree structure in accordance with the at least one EDI schema definition, the at least one EDI document being displayed in response to the at least one value being received by the at least one user input portion, wherein each of the first, second and third user interface components are simultaneously viewable, and
(iv) a fourth user interface component that displays an error and warning list wherein when a particular error or warning is selected in the error and warning list a corresponding element in the EDI schema definition and a corresponding element in the EDI document is caused to be selected and highlighted thereby facilitating editing of one of the EDI schema definition or the EDI document; and
an engine component that generates an EDI document based on the at least one value received by the at least one user input portion, and in accordance with EDI-FACT or X12 standards.

15. The computing subsystem of claim 14, wherein the engine component enables generation of at least one notification when at least one value received by the at least one user input portion does not conform to the at least one EDI schema definition.

16. The computing subsystem of claim 14, wherein the EDI document generator enables modification of at least one schema element of the EDI schema definition, such that the second user interface component displays at least one user input portion that receives at least one value for input to at least one EDI data element of at least one EDI document to be generated based on the modified at least one EDI schema definition.

* * * * *